US010997207B2

(12) United States Patent
Robinson et al.

(10) Patent No.: US 10,997,207 B2
(45) Date of Patent: *May 4, 2021

(54) CONNECTION MANAGEMENT IN A DISTRIBUTED DATABASE

(71) Applicant: Snowflake Inc., San Mateo, CA (US)

(72) Inventors: Eric Robinson, Sammamish, WA (US); Benoit Dageville, San Mateo, CA (US); Shigeyuki Takeda, San Mateo, CA (US); Kristopher Wagner, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,888

(22) Filed: Oct. 7, 2020

(65) Prior Publication Data

US 2021/0019331 A1    Jan. 21, 2021

Related U.S. Application Data

(63) Continuation of application No. 16/778,817, filed on Jan. 31, 2020, now Pat. No. 10,817,536, which is a
(Continued)

(51) Int. Cl.
*G06F 16/27* (2019.01)
*G06F 16/23* (2019.01)
(Continued)

(52) U.S. Cl.
CPC .............. *G06F 16/27* (2019.01); *G06F 16/21* (2019.01); *G06F 16/2379* (2019.01); *H04L 61/1511* (2013.01); *H04L 67/10* (2013.01)

(58) Field of Classification Search
CPC ....... G06F 16/27; G06F 16/21; G06F 16/2379
(Continued)

(56) References Cited

U.S. PATENT DOCUMENTS 6,490,610 B1    12/2002  Rizvi et al.
7,627,584 B2    12/2009  Claborn et al.
(Continued)

FOREIGN PATENT DOCUMENTS

WO    WO-20200199107 A1    9/2020

OTHER PUBLICATIONS

"U.S. Appl. No. 16/357,822, Non Final Office Action dated Aug. 6, 2020", 19 pgs.
(Continued)

*Primary Examiner* — Shahid A Alam
(74) *Attorney, Agent, or Firm* — Schwegman Lundberg & Woessner, P.A.

(57) ABSTRACT

The subject technology generates a unique identification that references a first connection object of a first deployment and a second connection object of a second deployment of a database. The subject technology receives a notification that the first deployment is unavailable, the notification that the first deployment is unavailable comprises an indication of a downtime for the first deployment. The subject technology provides an external connection group unique identification to the second deployment for the second deployment to determine whether a client is to be connected to the second deployment. The subject technology receives a uniform resource locator from the second deployment when a client device is to be connected to the second deployment, the uniform resource locator being provided to the client device for connecting to the second deployment.

30 Claims, 14 Drawing Sheets

Related U.S. Application Data continuation of application No. 16/357,822, filed on Mar. 19, 2019.

(51) Int. Cl.
  *H04L 29/12* (2006.01)
  *H04L 29/08* (2006.01)
  *G06F 16/21* (2019.01)

(58) Field of Classification Search
  USPC .......................................................... 707/609
  See application file for complete search history.

(56) References Cited

U.S. PATENT DOCUMENTS

| | | | |
|---|---|---|---|
| 7,793,113 | B2 | 9/2010 | Bhogal et al. |
| 10,817,536 | B2 | 10/2020 | Robinson et al. |
| 2004/0103088 | A1 | 5/2004 | Cragun et al. |
| 2005/0216503 | A1 | 9/2005 | Charlot et al. |
| 2007/0100957 | A1 | 5/2007 | Bhogal et al. |
| 2008/0162509 | A1* | 7/2008 | Becker ............... G06F 16/2379 |
| 2008/0222164 | A1 | 9/2008 | Bhogal et al. |
| 2009/0170557 | A1 | 7/2009 | Chauhan et al. |
| 2010/0234073 | A1 | 9/2010 | Kusano |
| 2012/0131093 | A1 | 5/2012 | Hamano et al. |
| 2012/0159234 | A1 | 6/2012 | Mehta et al. |
| 2013/0054526 | A1 | 2/2013 | Di Vincenzo |
| 2016/0087933 | A1 | 3/2016 | Johnson et al. |
| 2016/0269249 | A1 | 9/2016 | Maes |
| 2016/0291959 | A1* | 10/2016 | Searle ..................... H04L 63/10 |
| 2017/0323247 | A1 | 11/2017 | Tran et al. |
| 2017/0371968 | A1 | 12/2017 | Horowitz et al. |
| 2020/0301942 | A1 | 9/2020 | Robinson et al. |
| 2020/0301943 | A1 | 9/2020 | Robinson et al. |

OTHER PUBLICATIONS

"U.S. Appl. No. 16/357,822, Preliminary Amendment Filed", 12 pgs.

"U.S. Appl. No. 16/778,817, Non Final Office Action dated Apr. 29, 2020", 17 pgs.

"U.S. Appl. No. 16/778,817, Notice of Allowance dated Aug. 24, 2020", 11 pgs.

"U.S. Appl. No. 16/778,817, Response Filed Jul. 28, 2020 to Non Final Office Action dated Apr. 29, 2020", 13 pgs.

"International Application Serial No. PCT/US2020/023447, Written Opinion dated Jun. 18, 2020", 11 pgs.

"U.S. Appl. No. 16/357,822, Examiner Interview Summary dated Nov. 2, 2020", 4 pgs.

"U.S. Appl. No. 16/357,822, Notice of Allowance dated Dec. 31, 2020", 10 pgs.

"U.S. Appl. No. 16/357,822, Response filed Nov. 4, 2020 to Non Final Office Action dated Aug. 6, 2020", 18 pgs.

\* cited by examiner

CONNECTION MANAGEMENT IN A DISTRIBUTED DATABASE

CROSS-REFERENCE TO RELATED APPLICATIONS

The present application is a continuation of, and hereby claims priority under 35 U.S.C. § 120 to U.S. Non-Provisional patent application Ser. No. 16/778,817, entitled "TRANSFERRING CONNECTIONS IN A MULTIPLE DEPLOYMENT DATABASE," filed on Jan. 31, 2020, which is a continuation of U.S. Non-Provisional patent application Ser. No. 16/357,822, entitled "TRANSFERRING CONNECTIONS IN A MULTIPLE DEPLOYMENT DATABASE," filed on Mar. 19, 2019, the contents of each are hereby incorporated in their entireties for all purposes.

TECHNICAL FIELD

This disclosure relates to databases and more particularly relates to database connections in a database system having multiple deployments.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

There exist multiple architectures for traditional database systems and cloud database systems. One example architecture is a shared-disk system. In the shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and write operations. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node also performs the storage function, this architecture requires at least one processing node to store data. Thus, the shared-nothing architecture fails to store data if all processing nodes are removed. Additionally, management of data in a shared-nothing architecture is complex due to the distribution of data across many different processing nodes.

In some instances, it may be beneficial to replicate database data across multiple geographic locations, across multiple database vendors or providers, and/or across multiple computing devices that may be located in the same physical location or in two or more different locations. These multiple locations, vendors, providers, and/or computing devices may be referred to herein as "deployments." This may provide significant benefits to a database client because the data is backed up in more than one location. In the event that one deployment is unavailable due to, for example, a power outage, a system error, a scheduled maintenance downtime, and so forth, a different deployment may take over the management and operation of the database. This may provide peace of mind to a client so they know that the database data may be accessed at all times and/or so they know the database data is replicated and secured across the multiple deployments. However, many significant challenges come with providing multiple deployments of the same database.

One challenge is that each deployment must have an up-to-date copy of the database data. Some databases may be constantly changed with new content, updated content, and/or deletions of content. These changes may be executed on a single deployment of the database. Some changes require significant time and computing resources, particularly updates, deletions, and merges. It can be difficult to propagate database changes to multiple deployments such that the content of each deployment can be relied upon at any given time. Further, it can be difficult to propagate database changes in a cost effective manner such that time and computing resources are used efficiently at each database deployment.

An additional challenge with replicating database data is how the operation of the database is changed from one deployment to a different deployment. One database may have a primary deployment and multiple secondary or backup deployments. It can be challenging to seamlessly transition from a primary deployment to a secondary deployment due to a scheduled transition or because the primary deployment experienced a failure. There are numerous challenges associated with ensuring that the database data is up-to-date and properly replicated between the primary deployment and the secondary deployments. Further, in an instance where a primary deployment experiences a failure and database operations transition to a secondary deployment, there are numerous challenges associated with updating the original primary deployment when it becomes available again after the failure. The original primary deployment must be updated such that all updates that were executed during the failure are propagated without errors and without consuming significant time or computing resources.

The systems, methods, and devices described herein provide an improved approach to database replication, database failover, and seamless transitions between database deployments.

BRIEF DESCRIPTION OF THE DRAWINGS

Non-limiting and non-exhaustive implementations of the present disclosure are described with reference to the following figures. Advantages of the present disclosure will become better understood with regard to the following description and accompanying drawings where.

DETAILED DESCRIPTION

Figure 1:
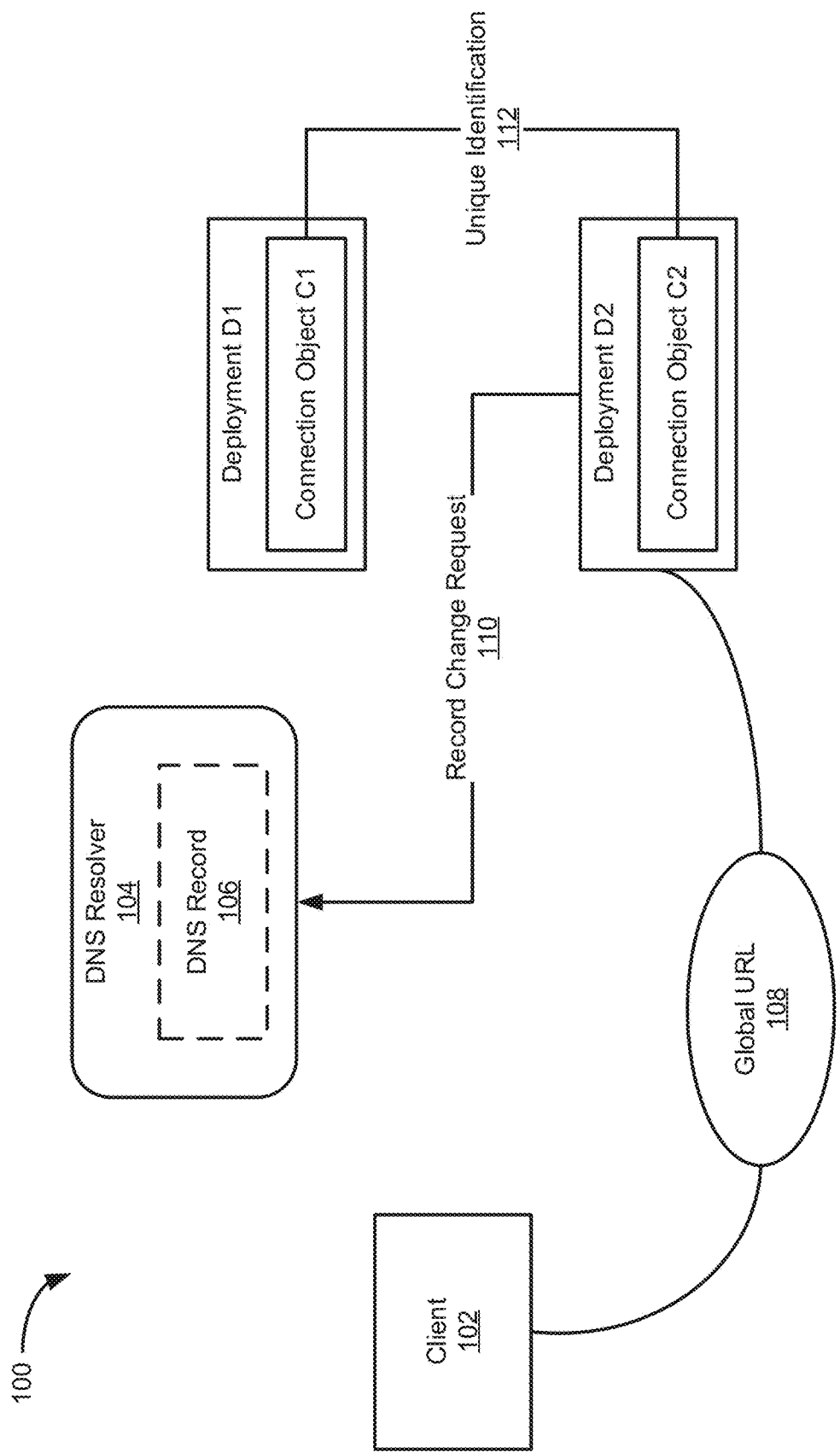
FIG. 1 is a schematic diagram of a system for transitioning a client connection from a first deployment to a second deployment with a Domain Name System implementation in accordance with the teachings and principles of the disclosure.

The disclosure extends to systems, methods, and devices for transferring connections in a multiple deployment database. Database systems may have data stored across multiple deployments and/or replicated in multiple deployments. A database deployment may include database storage resources and/or database management resources such as a data lake or data warehouse. A single database may have data stored in multiple different deployments where the different deployments may be located in different geographic regions, may be serviced by different providers, may store different portions of database data, may have architectural or structural differences, may be replications of one another, and so forth. Updates to the database data, such as inserts, deletes, merges, and so forth may be performed on a primary deployment and propagated to one or more secondary deployments. Queries on the database data may be performed on the primary deployment. In an implementation, it may be beneficial to change the primary deployment due to a system outage, a client preference, a scheduled maintenance, to meet a client performance threshold, and so forth. Systems, methods, and devices disclosed herein provide improved means for transitioning connections in a multiple deployment database such that database traffic between a client and the database is moved from a first primary deployment to a new primary deployment.

A method for transitioning a client connection in a multiple deployment database system is disclosed. The method includes maintaining the client connection between a client and a first deployment such that database traffic occurs at the first deployment. The method includes generating a unique identification that references a first connection object of the first deployment and a second connection object of a second deployment. The method includes receiving a notification that the first deployment is unavailable. The method includes providing, by a client, an external connection group unique identification to the second deployment for the second deployment to determine whether the client should be connected to the second deployment. The external connection group UUID may be based on the unique identification and provides an indication to the client of which connection groups the client is associated with. The method includes receiving a uniform resource locator from the second deployment if the client should be connected to the second deployment.

A database connection may be transitioned from a current primary deployment to a new primary deployment. It may be undesirable to transition the database connection without ensuring that the new primary deployment is updated and is not stale with respect to the current primary deployment. For example, the database connection (i.e., the connection that provides a means for initiating updates or queries on the database) may be connected to the current primary deployment such that all updates and queries on the database are performed at the current primary deployment. The current primary deployment may become unavailable and it may be desirable to transition the database connection to the new primary deployment (which was previously serving as a secondary deployment to the current primary deployment). If the new primary deployment is stale, then it cannot serve as an accurate source of database data when updates and/or queries are executed on the database after the connection is transitioned from the current primary deployment to the new primary deployment. For example, if updates made to the current primary deployment were not propagated to the new primary deployment when the new primary deployment was serving as a secondary deployment, then the new primary deployment will be stale and cannot return accurate query results after the database connection is transitioned. In certain implementations, a level of staleness may be tolerated in secondary deployments. However, it is desirable to ensure that all secondary deployments are an accurate representation of the database data. Therefore, it is desirable to replicate the primary deployment across all secondary deployments and propagate any updates made to the primary deployment to each of the secondary deployments. Systems, methods, and devices are disclosed herein for replicating database data and database metadata between a primary deployment and one or more secondary deployments.

The systems, methods, and devices for transitioning a connection in a multiple deployment database system may be implemented with cloud-based database technology. Database data may be stored in cloud based storage that is accessible across geographic regions. This cloud-based storage refers to database data that is stored at an off-site storage system that may be maintained by a third party in some implementations. For example, a client may elect to store data with a cloud storage provider rather than storing the data on a local computer hard drive or other local storage device owned by the client. The client may access the data by way of an Internet connection between the client's computing resources and the off-site storage resources that are storing the client's data.

Cloud storage of database data may provide several advantages over traditional on-site local storage. When the database data is stored in cloud storage, the information may be accessed at any location that has an Internet connection. Therefore, a database client is not required to move physical storage devices or use the same computer to save, update, or retrieve database information. Further, the database information may be accessed, updated, and saved by multiple users at different geographic locations at the same time. The client may send copies of files over the Internet to a data server associated with the cloud storage provider, which records the files. The client may retrieve data by accessing the data server associated with the cloud storage provider by way of a Web-based interface or other user interface. The data server associated with the cloud storage provider may then send files back to the client or allow the client to access and manipulate the files on the data server itself.

Cloud storage systems typically include hundreds or thousands of data servers that may service multiple clients. Because computers occasionally require maintenance or repair, and because computers occasionally fail, it is important to store the same information on multiple machines. This redundancy may ensure that clients can access their data at any given time even in the event of a server failure.

Cloud-based database storage systems may include multiple deployments. In the present disclosure, a deployment may include one or more compute and/or storage resources for storing and/or managing database data. A deployment may include a collection of resources for storing database data, and a deployment may be in communication with other systems and devices by way of a network connection such as an Internet connection. In various embodiments, deployments may be located in different geographic locations, may be operated on different storage resources, may be operated on different compute resources, may be managed by different cloud-based providers, and so forth. In an example, a cloud-based database system stores database data across four deployments. One deployment is located in an East geographic region and is managed by a first cloud-based storage provider. Another deployment is located in a West geographic region and is also managed by the first cloud-based storage provider. Another deployment is operated in an East geographic region and is managed by a second cloud-based storage provider. Another deployment is operated in a West geographic region and is managed by the second cloud-based storage provider. In the example, each of the four deployments includes a collection of computing resources in communication with a network connection, such as an Internet connection. Each of the four example deployments may store a portion of the database data or may store an entire copy of the database. The database data stored across the four example deployments may be different for each database client that uses the cloud-based database system. For example, a first client may elect for its primary deployment to be the deployment located in the East region that is managed by the second cloud-based storage provider. The first client may elect for each of the remaining example deployments to serve as a secondary deployment and to maintain a copy of the first client's database data. A cloud-based database system may use and/or be in communication with any number of deployments.

In an embodiment, different deployments are located in the same geographic region and are managed by the same cloud-based storage provider. In an embodiment, different deployments are located in different geographic regions and are managed by the same cloud-based storage provider. In an embodiment, different deployments are located in the same geographic region and are managed by different cloud-based storage providers.

In an embodiment of the disclosure, database data is stored across multiple cloud storage deployments. Such cloud storage deployments may be located in different geographic locations and the database data may be stored across multiple machines and/or servers in each of the deployments. The cloud storage deployments may be located in a single geographic location but may be connected to different power supplies and/or use different computing machines for storing data. The cloud storage deployments may be operated by different cloud storage providers. In such embodiments, the database data is replicated across the multiple deployments such that the database data may continue to be accessed, updated, and saved in the event that one deployment becomes unavailable or fails. In an embodiment, database data is stored in a primary deployment and is further stored in one or more secondary deployments. The primary deployment may be used for accessing, querying, and updating data at all times when the primary deployment is available. The one or more secondary deployments may assume operations if and when the primary deployment becomes unavailable. When the primary deployment becomes available again, the primary deployment may be updated with any changes that occurred on the one or more secondary deployments when the primary deployment was unavailable. The updated primary deployment may then resume operations, including accessing, querying, and updating data.

When data is stored across multiple deployments, it is important to ensure that the data is consistent across each of the deployments. When data is updated, modified, or added to a primary deployment, the updates may be propagated across the one or more secondary deployments to ensure that all deployments have a consistent and up-to-date version of the data. In the event that a primary deployment becomes unavailable, each of the up-to-date secondary employments may assume operation of the data without the data being stale or incorrect. Further, when any of the multiple deployments becomes unavailable, the deployment may later be updated with all changes that were made during the time when the deployment was unavailable. When the deployment is updated after being "offline" or unavailable, it may be beneficial to ensure that the deployment is updated with only those changes made during the time the deployment was unavailable.

A database table may be altered in response to a data manipulation (DML) statement such as an insert command, a delete command, a merge command, and so forth. Such modifications may be referred to as a transaction that occurred on the database table (the modification may alternatively be referred to herein as an "update"). In an embodiment, each transaction includes a timestamp indicating when the transaction was received and/or when the transaction was fully executed. In an embodiment, a transaction includes multiple alterations made to a table, and such alterations may impact one or more micro-partitions in the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

In the following description of the disclosure, reference is made to the accompanying drawings, which form a part hereof, and in which is shown by way of illustration specific implementations in which the disclosure may be practices. It is understood that other implementation may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g., files or blocks.

As used herein, "partitioning" is defined as physically separating records with different data to separate data partitions. For example, a table can partition data based on the country attribute, resulting in a per-country partition.

As used herein, "deployment" is defined as a collection of compute and storage resources for providing data warehousing of database data. A deployment may include network traffic routing components, resource management components, metadata storage components, micro-partition metadata components, micro-partition organization components, and others as needed. A deployment may include cloud provider interfaces for provisioning additional compute resources for resource management, for provisioning additional compute resources for one or more execution platforms, for managing security components, for provisioning storage components, and for generating and managing cloud provider users, roles, policies, and so forth. A deployment may communicate with other deployments, services, devices, and systems by way of files or micro-partitions written to storage or by way of direct access to a metadata store. A deployment includes components necessary for providing data warehousing services.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Referring now to the figures, FIG. 1 is a schematic diagram of a system 100 for transitioning a client database connection from a first deployment to a second deployment using a DNS (Domain Name System) implementation. The system 100 may be implemented to failover from a primary deployment to a secondary deployment. The system 100 includes a client 102 that may be in communication with one or more deployments. As illustrated in FIG. 1, the client 102 may be in communication with one or both of a deployment D1 and a deployment D2. The system 102 includes DNS (Domain Name System) resolver 104 that maintains a DNS (Domain Name System) record 106. The deployment D1 maintains a connection object C1 and the deployment D2 maintains a connection object C2.

The DNS resolver 104 routes traffic from a first deployment to a second deployment. In an embodiment, the DNS resolver 104 may transition a client 102 connection from a first deployment to a second deployment without significant instruction from the client 102. The DNS resolver 104 may update records to no longer point to the first deployment and begin to point to the second deployment. In an embodiment, the DNS resolver 104 is provided by a third party that is separate and independent from one or more deployments, from storage devices storing the database data, from storage devices storing database data, from database management resources, from an execution platform, and so forth. In an embodiment, the DNS record 106 resides with the third-party DNS resolver 104. The DNS resolver 104 may be configured to transition a client 102 connection from a first deployment to a second deployment where the two deployments are provided by different cloud-based database providers, or located in different geographic regions, or are separated by any other means or for any other purpose.

A method of transitioning a client 102 connection by way of the system 100 illustrated in FIG. 1 may include the following steps. The connection object C1 is generated in deployment D1 and the connection object C2 is generated in deployment D2. Connection object C1 and connection object C2 are tied together with a unique identification 112 (uID). A global URL (Uniform Resource Locator) 108 is generated for the DNS resolver 104 using the unique identification 112 that refers to the tied connection objects C1 and C2. The connection objects C1 and C2 include a piece of metadata that exists in the system 100. In an example, a database client may generate a connection object using syntax such as "create connection my_conn" and the unique identification 112 may be generated by the system 100. To tie the connection objects C1 and C2 together, the second connection objection may be created using syntax such as "create connection my_conn2," replication group "<UUID from my_conn," for example. At any given time, the DNS resolver 104 points to a primary deployment; in the system 100 illustrated in FIG. 1, the DNS resolver 104 may point to deployment D1 as the primary deployment or it may point to deployment D2 as the primary deployment. It should be appreciated that the DNS resolver 104 may point to any deployment as the primary deployment and that any number of secondary deployments may exist. The primary deployment at any given time is the deployment that is being pointed to by the DNS resolver 104. When the client 102 connection is to be transitioned from a first primary deployment to a new primary deployment (where the new primary deployment was previously a secondary deployment), a record change request 110 is sent to the DNS resolver 104.

In the system 100 illustrated in FIG. 1, the DNS resolver 104 previously pointed to deployment D1 as the primary deployment. To transition the client 102 connection from deployment D1 to deployment D2, the record change request 110 is submitted by deployment D2 (previously the secondary deployment and will become the new primary deployment) to the DNS resolver 104. The record change request 110 includes an indication that deployment D2 now wants the DNS resolver 104 to no longer point to deployment D1 but to instead point to deployment D2. The record change request 110 must be propagated everywhere, i.e., to the new primary deployment and to all secondary deployments. When the record change request 110 has been propagated by the DNS resolver 104, the global URL 108 used by the client 102 will then point to deployment D2 and will not longer point to deployment D1.

In an implementation, deployment D1 and deployment D2 are hosted by different cloud-based database providers. In an implementation, deployment D1 and deployment D2 are hosted by the same provider and located in different geographic regions. In an implementation, deployment D1 and deployment D2 are hosted by the same provider and located in the same geographic region. In an implementation, deployment D1 and deployment D2 are associated with two different accounts or databases that are hosted by the same provider and located in the same or different geographic regions. The system 100 disclosed herein may enable cross-cloud failover from a first deployment to a second deployment where the two deployments are hosted by different providers and/or may be hosted in different geographic regions.

Figure 2:
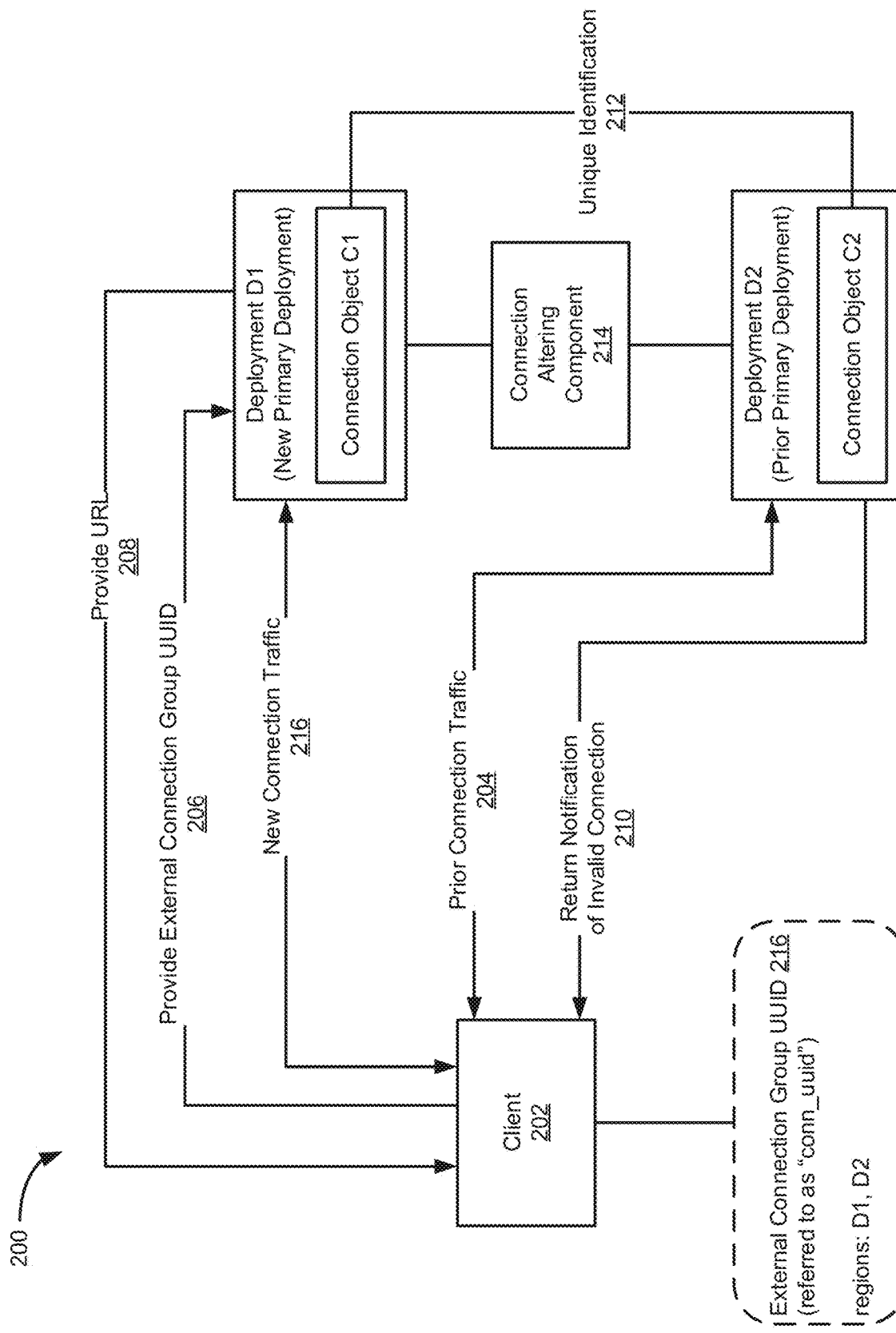
FIG. 2 is a schematic diagram of a system for transitioning a client connection from a first deployment to a second deployment with a Representation State Transfer (REST) request implementation in accordance with the teachings and principles of the disclosure.

FIG. 2 is a schematic diagram of a system 200 for transitioning a client connection from a first deployment to a second deployment using a REST (Representational State Transfer) implementation. The system 200 may be implemented to failover from a primary deployment to a secondary deployment. In certain implementations, the REST implementation disclosed in FIG. 2 may provide better performance and/or may be more reliable compared with the DNS implementation disclosed in FIG. 1. Further, in some implementations, the REST implementation disclosed in FIG. 2 may bypass the need to have a third party DNS resolver 104 update a DNS record 106 to execute the transition from the first deployment to the second deployment. The REST implementation disclosed in FIG. 2 may obviate the need to change a DNS record 106 and may therefore be faster and/or more reliable in certain implementations. In some implementations, it may be beneficial for a client to implement a hybrid approach using each of the DNS implementation illustrated in FIG. 1 and the REST implementation illustrated in FIG. 2.

In the REST implementation, much of the logic for a deployment failover may be owned and/or stored by the client 202 and is not pushed to a DNS resolver. In the system 200, there is a connection object C1 associated with a deployment D1 and there is a connection object C2 associated with a deployment D2. The connection object C2 and the connection object C2 are tied by a unique identification (uID) 212. In the example illustrated in FIG. 2, deployment D1 is the new primary deployment and deployment D2 is the prior primary deployment (may alternatively be referred to as a second deployment and a first deployment, respectively). An external connection group unique identification 216 ("external connection group UUID") that is separate from the unique identification 212, but may be based on the unique identification 212, is provided to the client 202. The external connection group UUID 216 indicates which connection group the client 202 belongs to. In an embodiment, the external connection group UUID 216 references the unique identification 212. The external connection group UUID 216 may be referred to as the "conn_uuid." The external connection group UUID 216 includes a list of deployments associated with the client 202. The list of deployments may include one primary deployment and any number of secondary deployments. Numerous benefits are enabled by separating the external connection group UUID 216 and the unique identification 212. One benefit is that having separate identifications provide security benefits. In an example, if a third party had access to the external connection group UUID 216 (which may exist in a global URL), the third party still cannot figure out the unique identification 212 that ties connection object C1 and connection object C2.

In the example illustrated in FIG. 2, deployment D1 was a secondary deployment and became the primary deployment. Deployment D1 was the primary deployment and became a secondary deployment. Deployment D1 is the new primary deployment (may alternatively be referred to as the "second deployment") and deployment D1 is the prior primary deployment (may alternatively be referred to as the "first deployment"). When deployment D2 transitions from the primary deployment to a secondary deployment, all connections to deployment D2 will be closed and marked as invalid.

The client 202 wishes to connect with whichever deployment is currently the primary deployment. The client 202 sends a REST (Representational State Transfer) request to contact a deployment. In various embodiments, the REST request may be manually sent by a user or system administrator associated with the client 202 account, and/or the REST request may be automatically sent by a processor or other computing resource associated with the client 202 account without user interference. An account within deployment D1 knows that deployment D1 is the primary deployment because of the external connection group UUID 216; deployment D1 performs a lookup to query whether any connection groups exist within deployment D1. If the lookup is true, then the query will return which deployment is the primary. If the lookup based on the external connection group UUID 216 is invalid, then the lookup will return a response indicating the external connection group UUID 216 is invalid. If deployment D1 is the primary deployment based on the external connection group UUID 216, then deployment D1 returns a response to the client 202 that includes a URL (Uniform Resource Locator) for the client 202 to connect to the primary deployment.

The unique identification 212 is determined based on the connection object C1 for deployment D1 and the connection object C2 for deployment D2. The external connection group UUID 216 may be based on the unique identification 212, and the external connection group UUID 216 may be referred to as a "conn_uuid"). The unique identification 212 indicates the regions or deployments having database data associated with the client 202. The external connection group UUID 216 (i.e. the "conn_uuid") is a separate identification that may be based on the unique identification 212. The external connection group UUID 216 is provided to the client 202, and the client 202 sends the external connection group UUID 216 to the primary deployment to initiate a connection.

In the example illustrated in FIG. 2, the client 202 initially funnels connection traffic through deployment D2 (see 204). The client 202 continues to funnel connection traffic through deployment D2 (see 204) until deployment D2 returns a notification at 210 of an invalid connection. The deployment D2 returns the notification at 210 of an invalid connection when the deployment D2 performs a lookup with the external connection group UUID 216 and determines that deployment D2 is not the primary deployment. Deployment D2 returns an invalid response indicating that it is not the primary deployment. In response to receiving the notification of an invalid connection from deployment D2, the client 202 provides at 206 the external connection group UUID (the conn_uuid) to deployment D1. In an embodiment, the client 202 provides at 206 the external connection group UUID to all secondary deployments to determine which of the secondary deployments is now the primary deployment. In the example illustrated in FIG. 2 there are only two possible deployments (i.e., one primary deployment and one secondary deployment) but it should be appreciated there may be a primary deployment and any number of secondary deployments. Upon receiving the external connection group UUID from the client 202, deployment D1 performs a lookup using the external connection group UUID 216 to determine whether deployment D1 is now the primary deployment. In response to the lookup being true, deployment D1 provides at 208 a URL to the client 202 for the client 202 to connect to deployment D1 as the new primary deployment. The new connection traffic then travels between the client 202 and deployment D1 (see 216).

The unique identification 212 may be determined by a connection altering component 214. In an embodiment, to provide increased security for the client 202, the unique identification 212 is randomly generated and does not include any identifying information such as a name or an account number.

The client 202 may include a database client having database data stored across storage devices in one or more deployments. The client 202 may include an account providing access to users or system administrators to update and/or query the database data. The client 202 may include a resource manager and execution platform as disclosed herein.

The system 200 disclosed in FIG. 2 may be implemented for a "graceful" failover from a first deployment (i.e., deployment D2 in the example illustrated in FIG. 2) to a second deployment (i.e., deployment D1 in the example illustrated in FIG. 2). The graceful failover may be executed based on scheduled downtime for the first deployment for system updates or other scheduled reasons. The graceful failover may be manually initiated by a user or system administrator associated with the client 202. The user may manually indicate that the client 202 should transition all connection traffic from the current primary deployment to a new primary deployment. This may be based on any suitable reason that may be specific to the needs of the client 202. For example, the current primary deployment and the new primary deployment may be serviced by different cloud-based database providers and the client 202 may wish to test the new primary deployment, may prefer services or pricing with the new primary deployment, or may need to temporarily use the new primary deployment while the current primary deployment is offline. Another exemplary use of multiple deployments is for disaster recovery drills. In an example implementation, because outages are rare, the multiple deployments may be used for drills or exercises to ensure the database would continue to function as need in the event of an actual outage of a primary deployment. Further for example, the current primary deployment and the new primary deployment may be located in different geographic regions and the client 202 may prefer the geographic region of the new primary deployment or may wish to temporarily use the new primary deployment in that geographic region. It should be understood that the reasoning for transitioning the client connection from a current primary deployment to a new primary deployment may be specific to the needs of the client 202 and/or based on scheduled or unexpected downtime for the current primary deployment. In various implementations it may be desirable for the client 202 to have a primary deployment and multiple secondary deployments that are always prepared to takeover as the primary deployment on an as-needed basis. Further it may be desirable for the client 202 to have multiple deployments across multiple geographic regions and/or across multiple cloud-based database providers where the multiple deployments may be replications of each other and/or may provide different benefits for management of the client's 202 database data.

Figure 3:
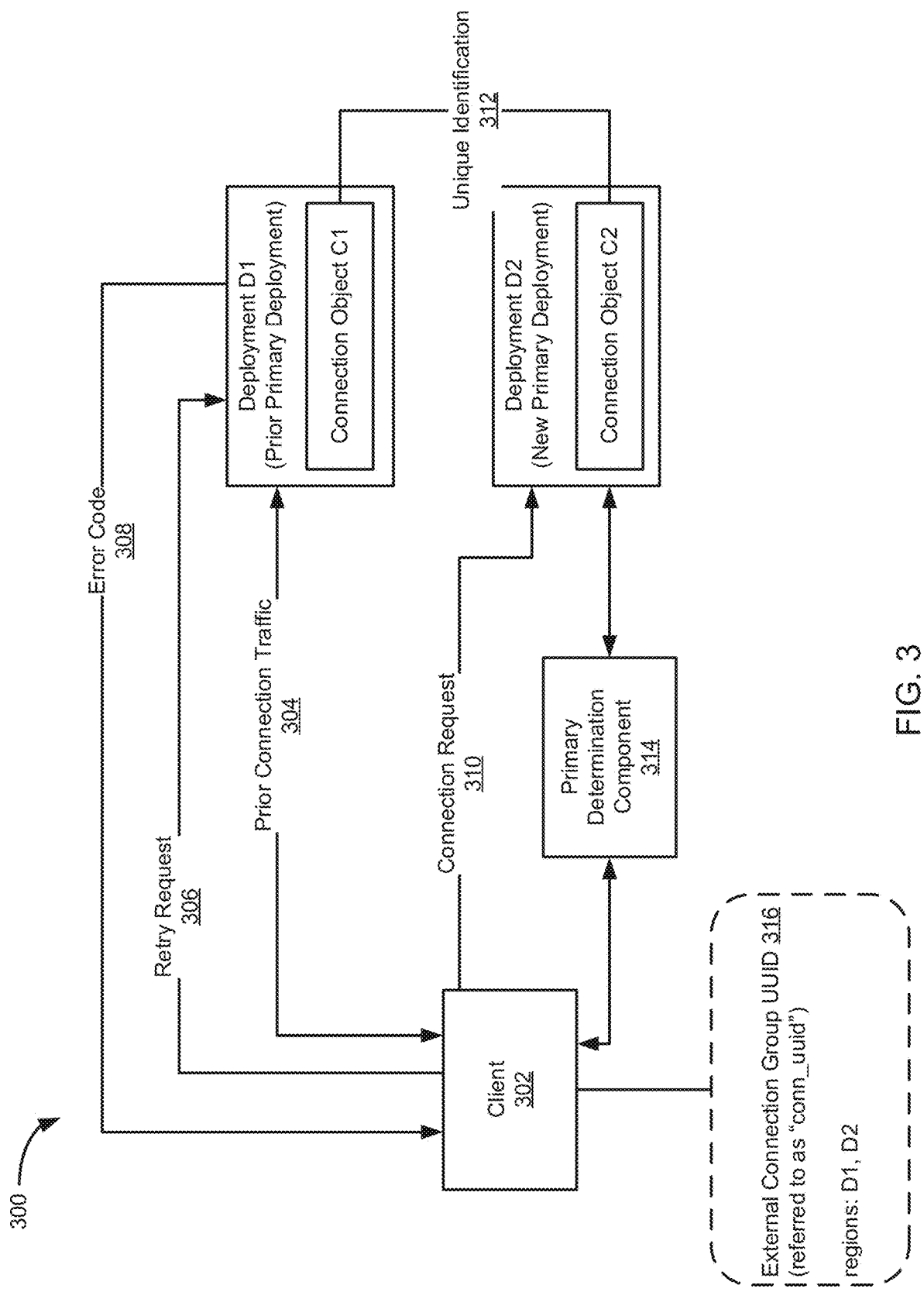
FIG. 3 is a schematic diagram of a system for transitioning a client connection from a first deployment to a second deployment with a Representation State Transfer (REST) request implementation in accordance with the teachings and principles of the disclosure.

FIG. 3 is a schematic diagram of a system 300 for transitioning a client connection from a first deployment to a second deployment using a REST (Representational State Transfer) implementation. The system 300 illustrated in FIG. 3 may be implemented in a "non-graceful" connection transition that is based on an unexpected failure of a current primary deployment. For example, where a current primary deployment is unexpectedly unavailable or offline due to a system error, power outage, or other failure, the system 300 may execute a client connection transfer from the failed current primary deployment to a new primary deployment that is available to takeover.

Similar to the implementations illustrated in FIGS. 1-2, there is a unique identification 312 based on a connection object C1 for a deployment D1 and further based on a 312 connection object C2 for a deployment D2. An external connection group UUID 316 may be based on the unique identification 312 and is provided to the client 302 such that the client can use the external connection group UUID 316 to determine which connection groups it is apart of. In the example illustrated in FIG. 3, deployment D1 is the prior primary deployment and deployment D2 is the new primary deployment such that the client connection will be transitioned from deployment D1 to deployment D2. The client 302 initially operates all connection traffic through deployment D1 (see 304). Deployment D1 may unexpectedly become unavailable and the client 302 will receive an error code 308 from deployment D1. The client 302 initiates a retry request 306 to determine whether deployment D1 is unavailable. In response to the client 302 determining that deployment D1 is unavailable (for example, based on receiving an error code 308), the client 302 will attempt to determine which deployment is now the primary deployment. The client 302 sends the external connection group UUID 316 to each of the possible deployments to determine if the primary deployment has changed from deployment D1 to any other deployment (in the example in FIG. 3, the primary deployment has shifted from deployment D1 to deployment D2). If the client 302 determines that the connection has changed and there is a new primary deployment, the client 302 will send a connection request 310 to the new primary deployment (in the example in FIG. 3, the new primary deployment is deployment D2). It should be appreciated that the client 302 may send a connection request 310 to a plurality of possible secondary deployments. The primary determination component 314 determines whether deployment D2 is now the primary deployment.

Figure 4:
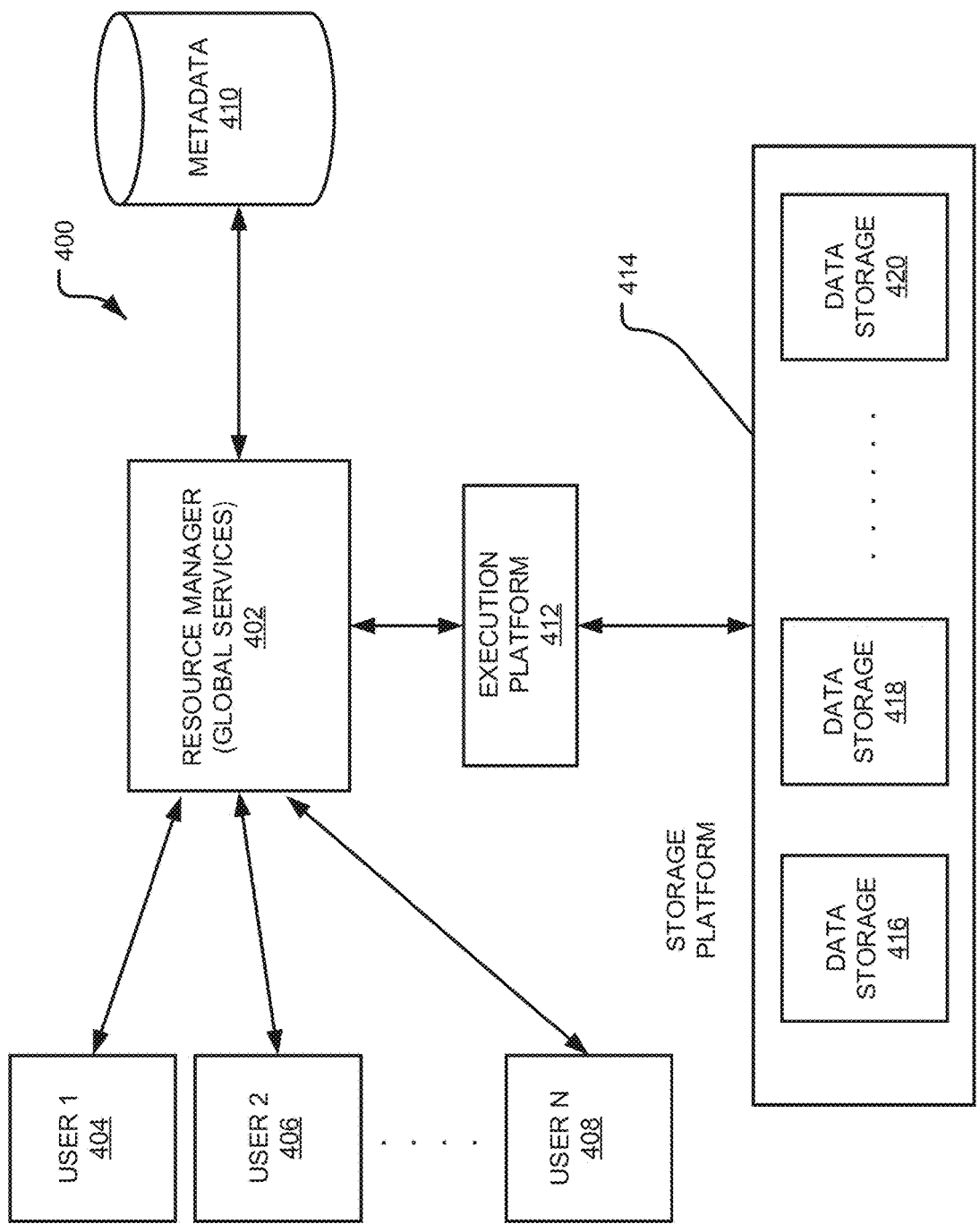
FIG. 4 is a block diagram of components of a retrieval and data storage system in accordance with the teachings and principles of the disclosure.

Referring now to FIG. 4, a computer system is illustrated for running the methods disclosed herein. As shown in FIG. 4, resource manager 402 may be coupled to multiple users 404, 406, and 408. In particular implementations, resource manager 402 can support any number of users desiring access to data processing platform 400. Users 404, 406, 408 may include, for example, end users providing data storage and retrieval requests, system administrators managing the systems and methods described herein, and other components/devices that interact with resource manager 402. The users 404, 406, and 408 may be referred to herein as "clients" and may have a direct connection to one or more deployments as disclosed herein. Each of the users 404, 406, and 408 may be connected to a primary deployment and have the capability to transition the connection from the primary deployment to a secondary deployment.

Resource manager 402 provides various services and functions that support the operation of all systems and components within data processing platform 400. Resource manager 402 may be coupled to metadata 410, which is associated with the entirety of data stored throughout data processing platform 400. In some embodiments, metadata 410 may include a summary of data stored in remote data storage systems as well as data available from a local cache. Additionally, metadata 410 may include information regarding how data is organized in the remote data storage systems and the local caches. Metadata 410 may allow systems and services to determine whether a piece of data needs to be processed without loading or accessing the actual data from a storage device.

Resource manager 402 may be further coupled to the execution platform 412, which provides multiple computing resources that execute various data storage and data retrieval tasks, as discussed in greater detail below. Execution platform 412 may be coupled to multiple data storage devices 416, 418, and 420 that are part of a storage platform 414. Although three data storage devices 416, 418, and 420 are shown in FIG. 4, execution platform 412 is capable of communicating with any number of data storage devices. In some embodiments, data storage devices 416, 418, and 420 are cloud-based storage devices located in one or more geographic locations. For example, data storage devices 416, 418, and 420 may be part of a public cloud infrastructure or a private cloud infrastructure. Data storage devices 416, 418, and 420 may be hard disk drives (HDDs), solid state drives (SSDs), storage clusters or any other data storage technology. Additionally, storage platform 414 may include distributed file systems (such as Hadoop Distributed File Systems (HDFS)), object storage systems, and the like.

In particular embodiments, the communication links between resource manager 402 and users 404, 406, and 408, metadata 410, and execution platform 412 are implemented via one or more data communication networks. Similarly, the communication links between execution platform 412 and data storage devices 416, 418, and 420 in storage platform 414 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 4, data storage devices 416, 418, and 420 are decoupled from the computing resources associated with execution platform 412. In an embodiment, each of a plurality of database deployments may include storage platform 414 having multiple data storage devices 416, 418, and 420. Each of the storage platforms 414 across the multiple deployments may store a replica of the database data such that each of the multiple deployments is capable of serving as a primary deployment where updates and queries are executed on the database data. This architecture supports dynamic changes to data processing platform 400 based on the changing data storage/retrieval needs as well as the changing needs of the users and systems accessing data processing platform 400. The support of dynamic changes allows data processing platform 400 to scale quickly in response to changing demands on the systems and components within data processing platform 400. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 402, metadata 410, execution platform 412, and storage platform 414 are shown in FIG. 4 as individual components. However, each of resource manager 402, metadata 410, execution platform 412, and storage platform 414 may be implemented as a distributed system (e.g., distributed across multiple systems/platforms at multiple geographic locations). Additionally, each of resource manager 402, metadata 410, execution platform 412, and storage platform 414 can be scaled up or down (independently of one another) depending on changes to the requests received from users 404, 406, and 408 and the changing needs of data processing platform 400. Thus, data processing platform 400 is dynamic and supports regular changes to meet the current data processing needs.

Figure 5:
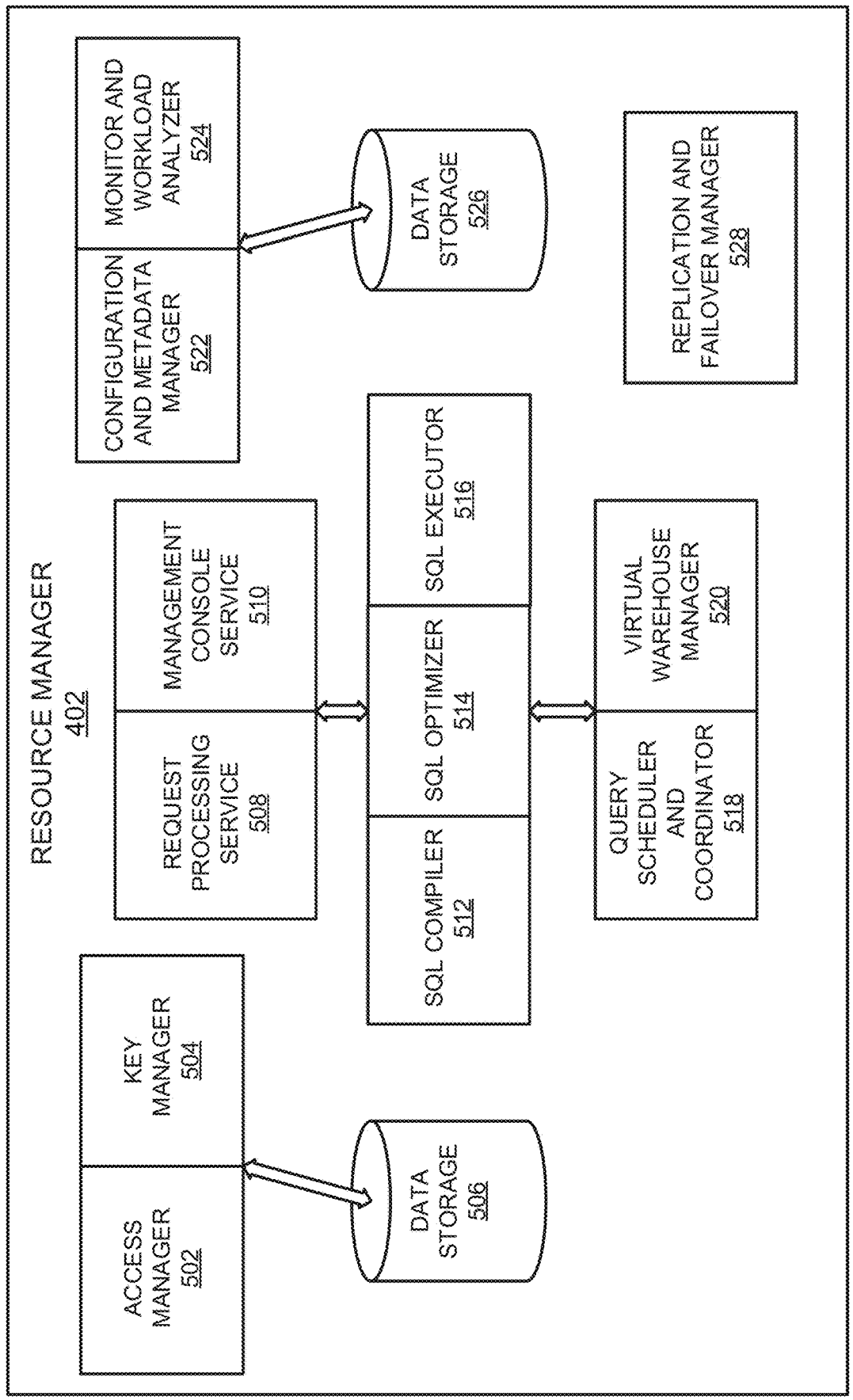
FIG. 5 is a block diagram of an embodiment of a resource manager in accordance with the teachings and principles of the disclosure.

FIG. 5 is a block diagram depicting an embodiment of resource manager 402. As shown in FIG. 4, resource manager 402 includes an access manager 502 and a key manager 504 coupled to a data storage device 506. Access manager 502 may handle authentication and authorization tasks for the systems described herein. Key manager 504 may manage storage and authentication of keys used during authentication and authorization tasks. A request processing service 508 manages received data storage requests and data retrieval requests. A management console service 510 supports access to various systems and processes by administrators and other system managers.

Resource manager 402 may also include an SQL compiler 512, an SQL optimizer 514 and an SQL executor 210. SQL compiler 512 parses SQL queries and generates the execution code for the queries. SQL optimizer 514 determines the best method to execute queries based on the data that needs to be processed. SQL executor 516 executes the query code for queries received by resource manager 402. A query scheduler and coordinator 518 may send received queries to the appropriate services or systems for compilation, optimization, and dispatch to the execution platform 412. A virtual warehouse manager 520 manages the operation of multiple virtual warehouses implemented in an execution platform.

Additionally, resource manager 402 includes a configuration and metadata manager 522, which manages the information related to the data stored in the remote data storage devices and in the local caches. A monitor and workload analyzer 524 oversees the processes performed by resource manager 402 and manages the distribution of tasks (e.g., workload) across the virtual warehouses and execution nodes in the execution platform. Configuration and metadata manager 522 and monitor and workload analyzer 524 are coupled to a data storage device 526.

Resource manager 402 also includes a replication and failover manager 528, which manages data replication requests, database failover, database fail back, and the transference of client connections from a first deployment to a second deployment. For example, replication and failover manager 528 manages and schedules batch data replication between multiple database storage resources and database deployments. In an embodiment, the replication and failover manager 528 may manage the replication of data stored within a primary deployment to be replication within one or more secondary or backup deployments. Further, the replication and failover manager 528 may manage the shifting of database operations from a primary deployment to a secondary deployment when the primary deployment fails and/or may manage the shifting of database operations from the secondary deployment back to the primary deployment when the primary deployment becomes available again. The replication and failover manager 528 may ensure consistent data replication between the multiple deployments and may further ensure that any updates made to a first deployment while a second deployment is unavailable are propagated to the second deployment when the second deployment becomes available again.

Figure 6:
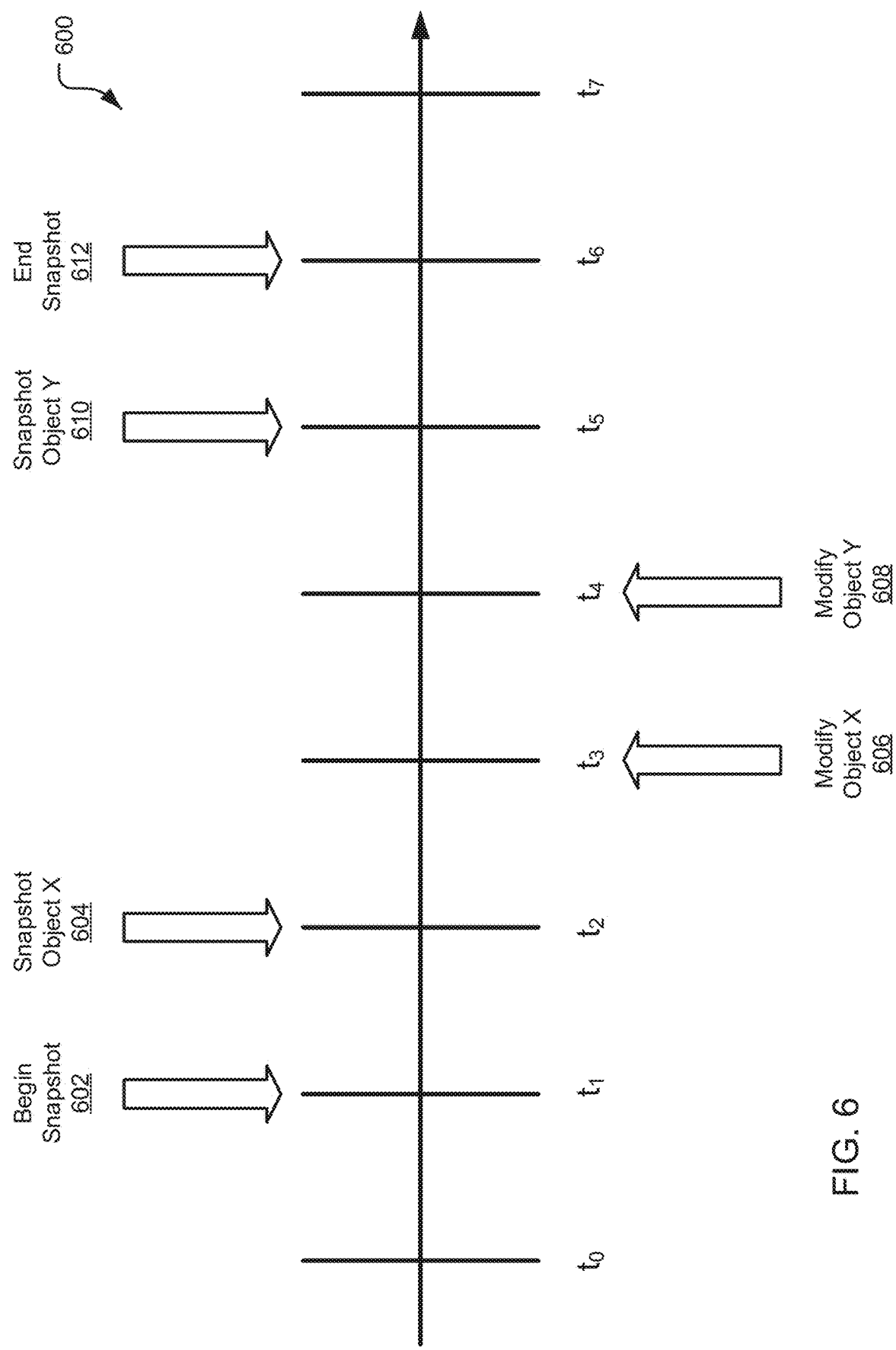
FIG. 6 is a schematic diagram of a process flow for generating a database snapshot in accordance with the teachings and principles of the disclosure.

FIG. 6 is a schematic diagram illustrating a process flow 600 for generating a database snapshot. The process flow 600 may be performed to replicate database data in a primary deployment into one or more secondary deployments. The snapshot may be generated, and a replication may be executed, before a secondary deployment is deemed up-to-date and ready to take over as the primary deployment. The process flow 600 may be used to ensure that the one or more secondary deployments have an accurate and up-to-date record of the database data such that the one or more secondary deployments are prepared to take over as the primary deployment in the event of a system or failure or scheduled downtime of the primary deployment. The database snapshot enables instantiating a copy of a source database in a different location, e.g., copying database data stored in a primary deployment into a secondary deployment. The snapshot captures one or more objects of the database, for example the structure of the database (e.g., schemas, tables, views, etc.) and/or the contents of the database (i.e., rows). In certain embodiments, the conceptually cleanest approach occurs where the snapshot reflects a transactionally consistent view of the database at a specific point in time. In an embodiment, a transactionally consistent point in time snapshot is not a strict requirement and it is sufficient to generate a snapshot that can be brought through the application of a set of transaction log records to a transactionally consistent state.

The process flow 600 illustrates a timeline depicting a snapshot that is initiated at time $t_1$ and completes at time $t_6$. The process flow 600 begins and a snapshot is initiated at 602. A snapshot of object X is generated at 604 at time $t_2$ and the snapshot of object Y is generated at 610 at time $t_5$. As illustrated, object X is modified at 606 at time $t_3$ and object Y is modified at 608 at time $t_4$. Object X is modified at 606 after the snapshot of object X is generated at 604. Object Y is modified at 608 before the snapshot of object Y is generated at 610. The snapshot ends at 612.

Depending on semantics of how individual object snapshots are generated, the process flow 600 illustrated in FIG. 6 may or may not produce a transactionally consistent point in time representation of objects X and Y. If the snapshot representation of an object is generated based on the state of the object at the time the snapshot was initiated, the snapshot itself will be a transactionally consistent representation of the database at the point at which the snapshot began. For example, in the context of FIG. 6, the semantics would correspond to producing snapshot representations of both X and Y based on the state at time $t_1$ and would lead to a snapshot that provides a transactionally consistent view of both X and Y at point in time $t_1$. If, however, the snapshot representation of an object is generated based on the object at the time the snapshot representation of the object is generated, the snapshot will not necessarily be a transactionally consistent representation of the database at any point in time. For example, in the context of FIG. 6, the semantics would correspond to producing a snapshot representation of X based on its state at time $t_2$ and a snapshot representation of Y based on its state at time $t_5$. This combination would produce a snapshot that corresponds to a database state that never existed and is potentially invalid depending on the relationship, if any, between the two modifications at 606 and 608.

In an embodiment, regardless of how the snapshot is generated, it is possible to bring the target to a transactionally consistent state at the end of the snapshot time by starting with the snapshot and then applying any log records generated during the snapshot timeframe in the serialized order of the log records. In such an embodiment, the previous statement assumes that applying a log record is an idempotent operation where the target database already reflects the update made by a particular log record and applying the log record is a no-op. In the context of such an example, applying the log records affiliated with the modifications at time $t_3$ and time $t_4$ to the generated snapshot will lead to an end state consistent as of time t regardless of how the individual object snapshots were generated.

In an embodiment of database replication, the snapshot provides the initial state for the target database upon which all subsequent changes will be applied. In an embodiment, a snapshot is generated for database data stored in a primary deployment such that the database data may be copied in one or more secondary deployments. In a further embodiment, a snapshot is generated for a secondary deployment to capture any updates made to the database data stored in the secondary deployment while a primary deployment, or one or more other secondary deployments, were unavailable. If the snapshot is inconsistent with the source database, the target database will also be inconsistent with the source database. Applying further changes to the inconsistent starting point will, in general, not correct the inconsistency. For example, if a client account fails over from a source database (in an embodiment, the source database is the primary deployment) to a replica secondary deployment that has drifted from the source database (in this case, the primary deployment), the net effect is data corruption and/or data loss. Because a failover can take place at any time, ensuring transaction consistency between a source database (e.g., primary deployment) and a target database (e.g., secondary deployment) may be critical to the value proposition of database replication. In an embodiment, ensuring consistency of the database constructed from a snapshot is a building block for establishing and maintaining consistency between a source database and a target database at all times.

Generating a Database Snapshot

In an embodiment, the various pieces of information that comprise a database includes metadata files, expression property files (EP files), and micro-partitions. Metadata files include information describing the structure of the database and may include the list and properties of any schemas in the database, the list and properties of tables and views in each schema, the list and properties of columns present in each table or view, and so forth. Individual table contents may be defined by a combination of EP files and metadata files. The individual tuple values of individual table contents may be stored in micro-partitions. In an embodiment, the precise set of micro-partitions that includes the contents of a particular table at a particular point in transactional time is included in the contents of a set of EP files. In an embodiment, an EP file can be considered to include a list of micro-partitions. Both micro-partitions and EP files are immutable and may be stored and encrypted in storage. In an embodiment, the list of EP files affiliated with a table at a particular point in transactional time is maintained in metadata files.

Generating Transaction Log Records

In an embodiment, a transaction log record ensures the log records themselves include enough information to correctly and unambiguously reproduce the transaction change on the target. This may be satisfied because changes applied by the transaction log are known at commit time and the method may include capturing and serializing the metadata changes made by the transaction. In an embodiment, the transaction log record is accessible to all target databases regardless of deployment, region, or underlying cloud provider. The transaction log record may be written to remote storage.

In an embodiment, a primary deployment becomes unavailable and all database operations are shifted to a secondary deployment. During the time when the primary deployment is unavailable, all updates to the database data may be executed on the secondary deployment. A transaction log record may be generated for all updates executed on the secondary deployment, and the transaction log record may be used to propagate those updates to the primary deployment when the primary deployment is no longer unavailable. In such an embodiment, the use of the transaction log record may ensure that only those new updates (made to the secondary deployment) are executed on the primary deployment, and that no stale data or previously ingested data is propagated to the primary deployment.

In an embodiment, in terms of when the transaction log record is generated, the systems, methods, and devices as disclosed herein are configured to ensure the write of the transaction log record is effectively part of the transaction itself. The transaction log record may only be written to remote storage if the transaction commits, and further the transaction only commits if the transaction log record is written to remote storage. A deviation from such a procedure may lead to a transactional inconsistency between the source database and the target database.

Figure 7:
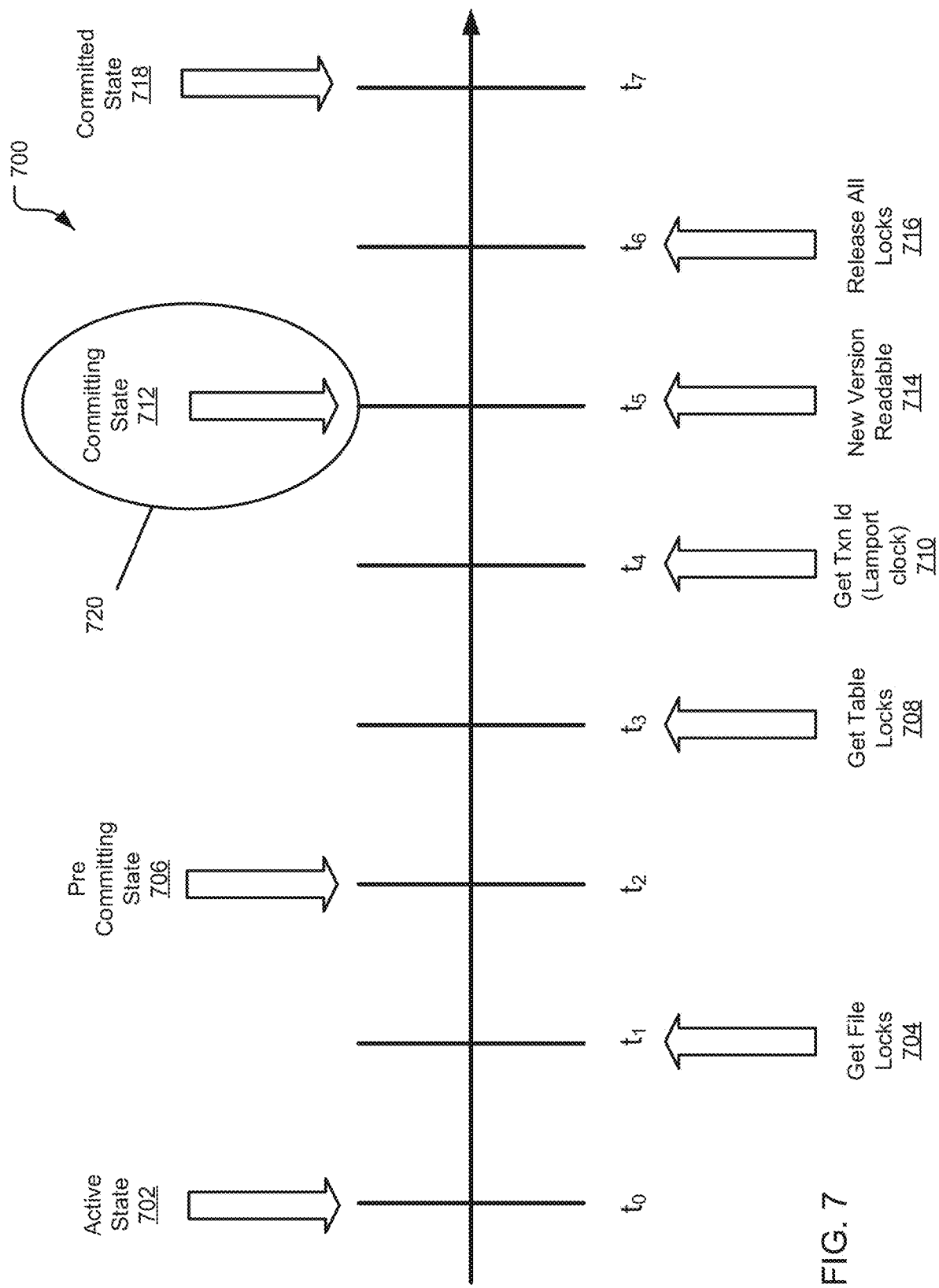
FIG. 7 is a schematic diagram of a process flow for generating a transaction log for replicating a database in accordance with the teachings and principles of the disclosure.

FIG. 7 is a schematic diagram illustrating a process flow 700 for generating transaction logs for replicating a database. The process flow 700 may be performed to ensure that one or more secondary deployments are an accurate and up-to-date representation of the database data stored in the primary deployment. This may ensure that the one or more secondary deployments are prepared to take over as the primary deployment in the event of a system failure or scheduled downtime for the primary deployment. The process flow 700 illustrates a timeline proceeding from left to right. In FIG. 7, transactions occurring in the internal transaction state are illustrated above the timeline and actions taken to support concurrency control and transaction processing are illustrated below the timeline. At time $t_0$, the transaction is open and in the active state at 702, and at this point no data manipulation language (DML) actions have been performed. At time $t_1$, processing of a DML statement is in-flight. During DML statement processing, the process flow 700 includes obtaining a file lock at 704 on the affected tables to support multiple concurrent DML operations targeting the same table. It should be appreciated that obtaining a file lock at 704 may occur any number of times and will occur multiple times in a multi-statement transaction. At time $t_2$, commit processing begins and the beginning of commit processing is recorded by transitioning to the pre-committing state at 706. At time $t_3$, the table locks are obtained at 708 on all tables modified in the transaction. After all table locks have been acquired at 708, an Account-level Lamport clock is utilized to generate a new and unique transaction identification at 710 at time $t_4$. In an embodiment, obtaining the transaction identification at 710 after acquiring all table locks at 708 ensures an unambiguous commit ordering (based on Lamport clock value) between any two potentially conflicting transactions. After obtaining a transaction identification at 710, the transaction is able to transition into the committing state at 712 at time $t_5$. In an embodiment, the transition to the committing state at 712 can represent a "point of no return" 720 for the transaction. Prior to this transition, the transaction commit itself could still be cancelled or aborted due to user action, processing error, system failure, etc. Once the transition to the committing state 712 has occurred, however, the transaction is effectively committed from the system perspective. At time $t_5$ the effects of the transaction are applied to the system and can no longer be rolled back. Note also that at time $t_5$ (below the timeline) the new table version is now readable at 714 by other concurrently running transactions. At time $t_6$, all locks held by the transaction are released at 716. Releasing locks enables any potentially conflicting transactions waiting on these locks (at 704 or 708) to acquire the locks needed to progress through the commit protocol. At time $t_7$, the transaction transitions to the committed state at 718 and has completed all processing. In an embodiment, any failures after time $t_5$ will not result in a rollback of the transaction. For example, if the node processing the transaction fails immediately after time $t_5$, for example, a new node will pick up processing where it was left off, release locks, and roll the transaction forward to completion.

In an embodiment, the transaction log record is written to remote storage at time $t_5$ at the transition into the committing state at 712. In certain embodiments it can be problematic to write the transaction log record to remote storage prior to time $t_5$ because it may still be possible for the process flow 700 to abort prior to time $t_5$. Further, writing the transaction log record as part of the post-commit processing after time $t_5$ may avoid errant transaction issues.

In an embodiment, writing the transaction log record as part of the post-commit processing after time $t_5$ as illustrated in FIG. 7 may avoid the errant transaction problem but may open the possibility to a failure between time $t_5$ and the write of the transaction log to remote storage may lead to a transaction being committed on the source database but not on the target database. Because the write to remote storage may be part of the post-transaction processing, it may reasonably be assumed to occur at some point after the source is operational again and the transaction cleanup proceeds to completion. After it has occurred, the target may pick up the change and there may no longer by a missing transaction. However, a problem scenario may arise where there is a failover 720 as illustrated in FIG. 7. If there is a failover 720 from source to target that occurs in the window between the crossing of the point of no return 720 and the write to remote storage. In this case, a transaction may have committed on the source and would not be present on the target. In an embodiment, if the write to remote storage is positioned between time $t_5$ and time t where all locks are released at 716, then all that is lost may be the last write to one or more tables and, furthermore, no explicit acknowledgment of the transaction commit of the affiliated write is ever sent back to an end user.

Figure 8:
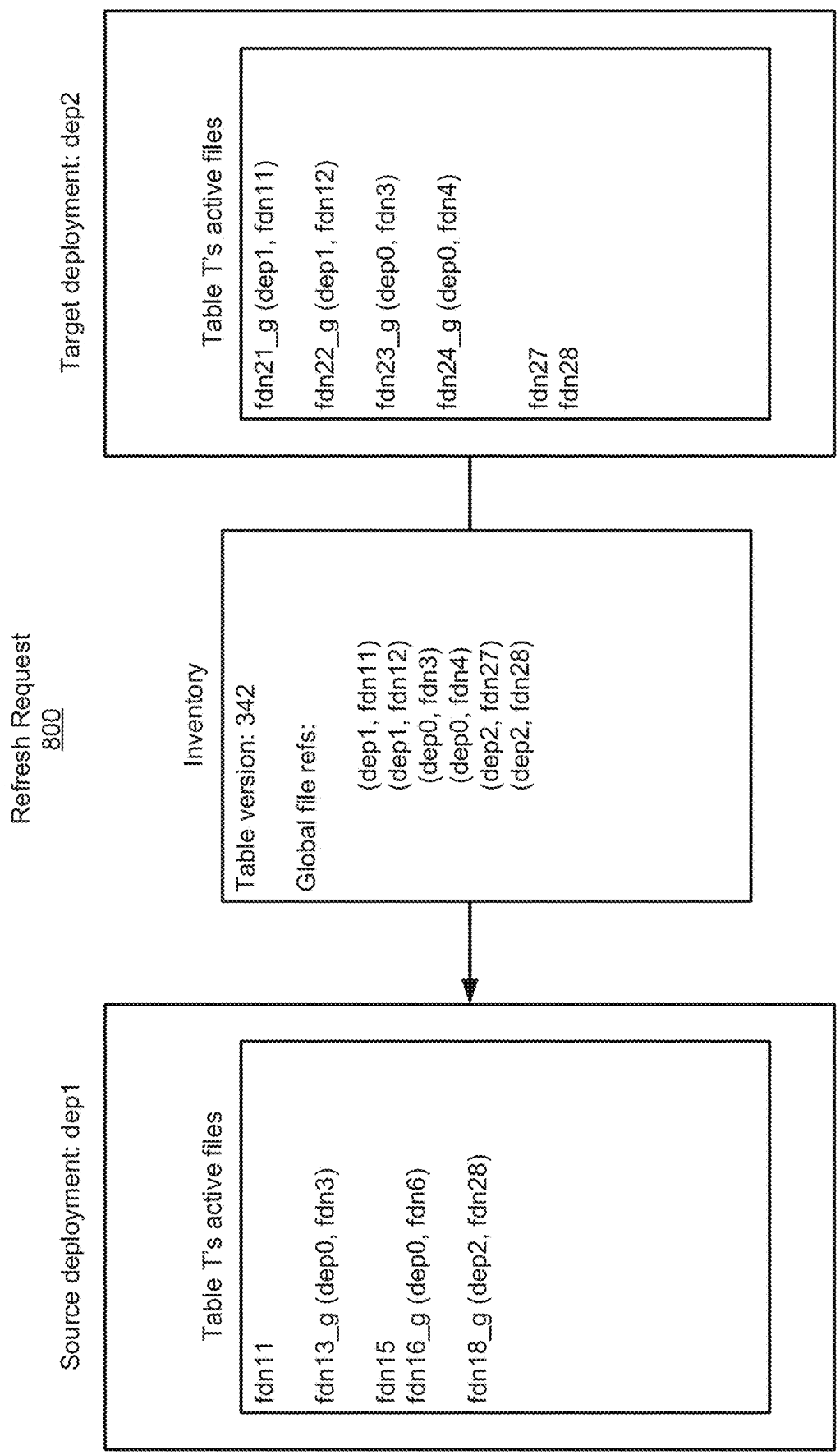
FIG. 8 is a block diagram illustrating the generating and transmission of a refresh request in accordance with the teachings and principles of the disclosure.

FIG. 8 illustrates sending a refresh request from a target deployment dep2 to a source deployment dep1. This refresh request may be initiated by a secondary deployment to a primary deployment in preparation for transitioning the client connection from the primary deployment to the secondary deployment (such that the secondary deployment assumes the role of primary deployment). The refresh request may be manually initiated by a user or system administrator associated with the client account in preparation for transitioning the client connection between deployments. This may be imitated in preparation for a scheduled downtime of a current primary deployment or it may be initiated to prepare for an unexpected system error or unexpected unavailability of the current primary deployment.

The source deployment dep1 includes a listing of table T's active files. The target deployment d2 also includes a listing of table T's active files. As depicted in the inventory box, the current table version is No. 342 by way of illustration. The inventory includes a listing of relevant global file references. The target deployment d2 converts all active files at table version No. 342 into a list of global file references according to the inventory. The locally added micro-partitions fdn27 and fdn28 are converted into global file references (dep2, fdn27) and (dep2, fdn28), respectively. As illustrated in FIG. 8, only global file references are sent as part of the table's inventory, and only active files are sent.

Figure 9:
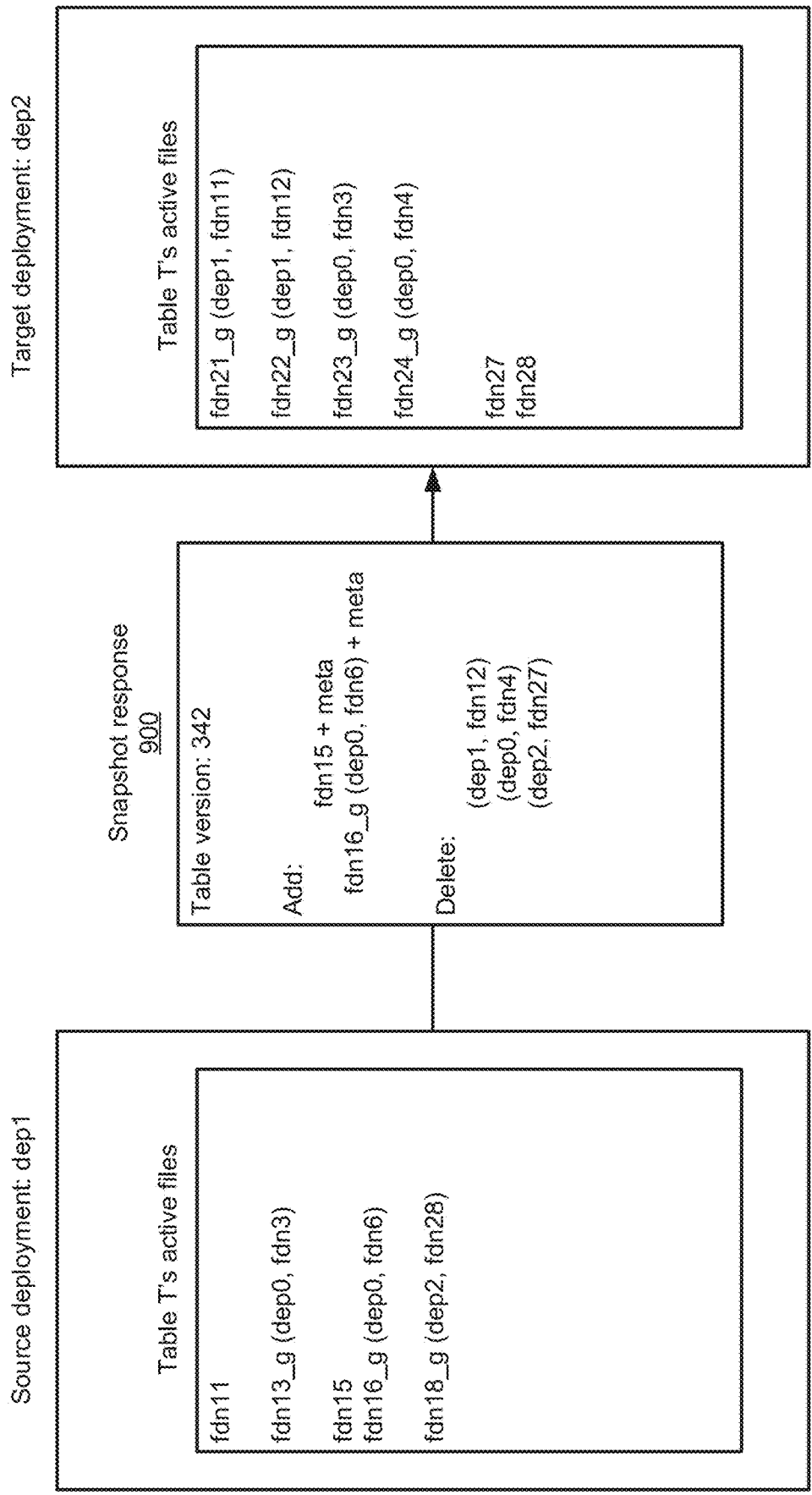
FIG. 9 is a block diagram illustrating the generation and transmission of a snapshot response in accordance with the teachings and principles of the disclosure.

FIG. 9 is a schematic diagram illustrating a snapshot response 900 for replicating a database. The snapshot response 900 is generated by the source deployment dep in response to the refresh request 800. The snapshot response 900 may be sent by a primary deployment to a secondary deployment that sent a refresh request. The snapshot response 900 includes one or more of: (a) all micro-partition metadata to be added to the table; (b) the actual micro-partitions in a re-encrypted state; (c) all global micro-partition references to be removed from the table; (d) the table version sent from the target deployment dep2; and (e) the replication master key from which the micro-partitions were re-encrypted. In an embodiment, the snapshot response 900 is partitioned into the snapshot response message, EP files, and micro-partitions. The snapshot response 900 message may include pointers to EP files. The EP files may include the added micro-partition metadata and deleted global file references. The EP files and micro-partitions may be copied to the target deployment d2's inbound volume.

FIG. 9 illustrates the source deployment dep1 transmitting the snapshot response 900 to the target deployment dep2. Each of the source deployment dep1 and the target deployment dep2 include a listing of table T's active files. The snapshot response 900 depicts table version No. 342 for illustration purposes and indicates the files and metadata to be added and deleted. In the embodiment illustrated in FIG. 9, the snapshot response 900 indicates that (fdn15 and its associated metadata) should be added along with (fdn16_g (dep0, fdn6) and its associated metadata). The snapshot response 900 indicates that (dep1, fdn12) and (dep0, fdn4) and (dep2, fdn27) should be deleted.

FIG. 9 illustrates that the target deployment dep2's table version No. 342 is sent back to the target deployment dep2. As illustrated in the discrepancy between the source deployment dep1 and the target deployment dep2, and as depicted in the snapshot response 900, the micro-partitions with short names fdn15 and fdn16_g need to be added to table T at the target deployment dep2. Further, micro-partitions with global file references (dep1, fdn12), (dep0, fdn4), and (dep2, fdn27) need to be removed from table T. Micro-partitions fdn15 and fdn16_g will be re-encrypted and uploaded to the target deployment dep2's inbound volume. The replication master key is part of the snapshot response (not illustrated in FIG. 9).

Figure 10:
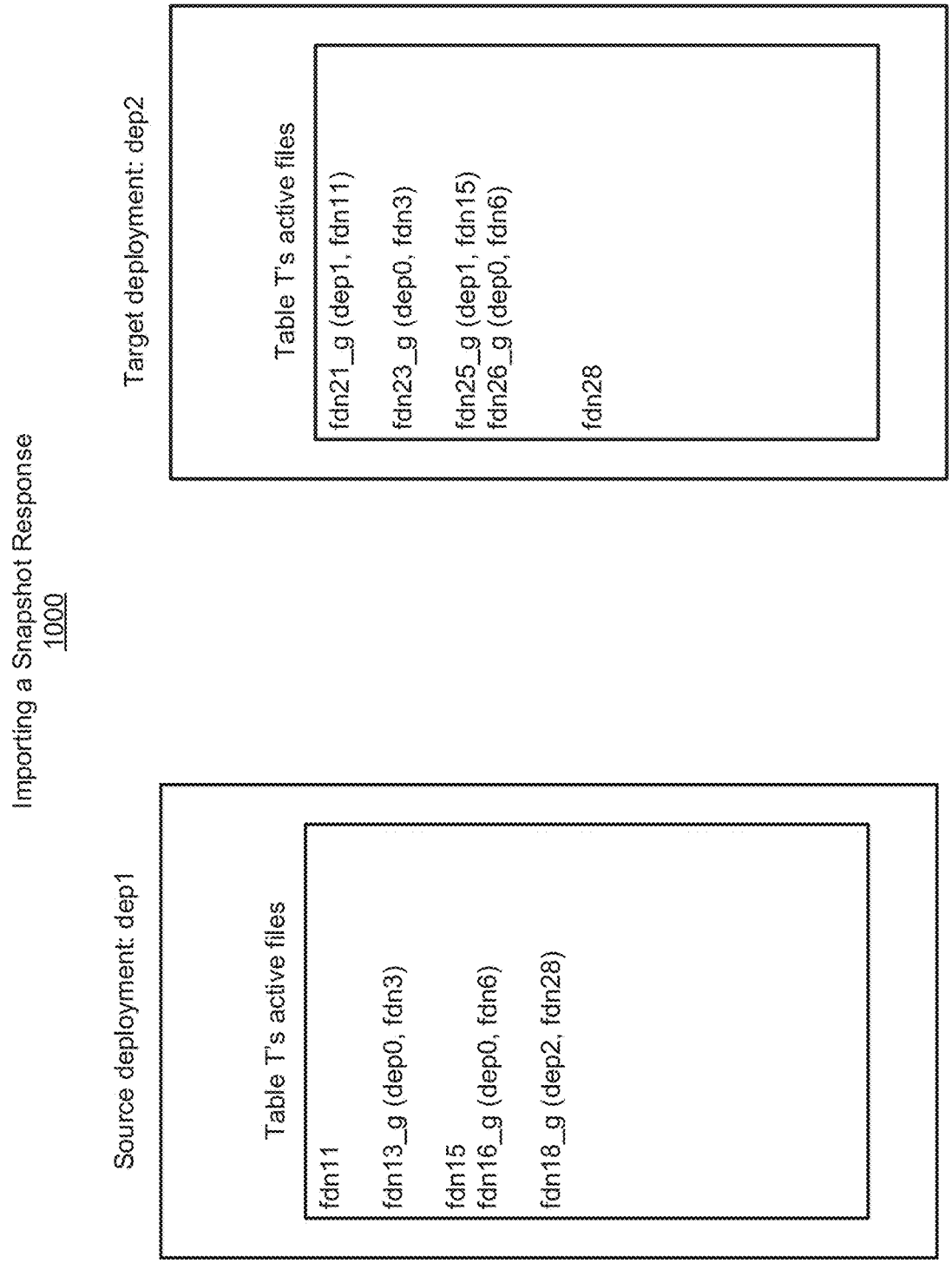
FIG. 10 is a block diagram illustrating the importation of a snapshot response in accordance with the teachings and principles of the disclosure.

FIG. 10 is a schematic diagram illustrating the importation 1000 of a snapshot response for replicating a database. The snapshot response may be imported by a secondary deployment in preparation for the secondary deployment to have an accurate and up-to-date replica of the database data such that the secondary deployment may assume the role of primary deployment if needed.

Figure 11:
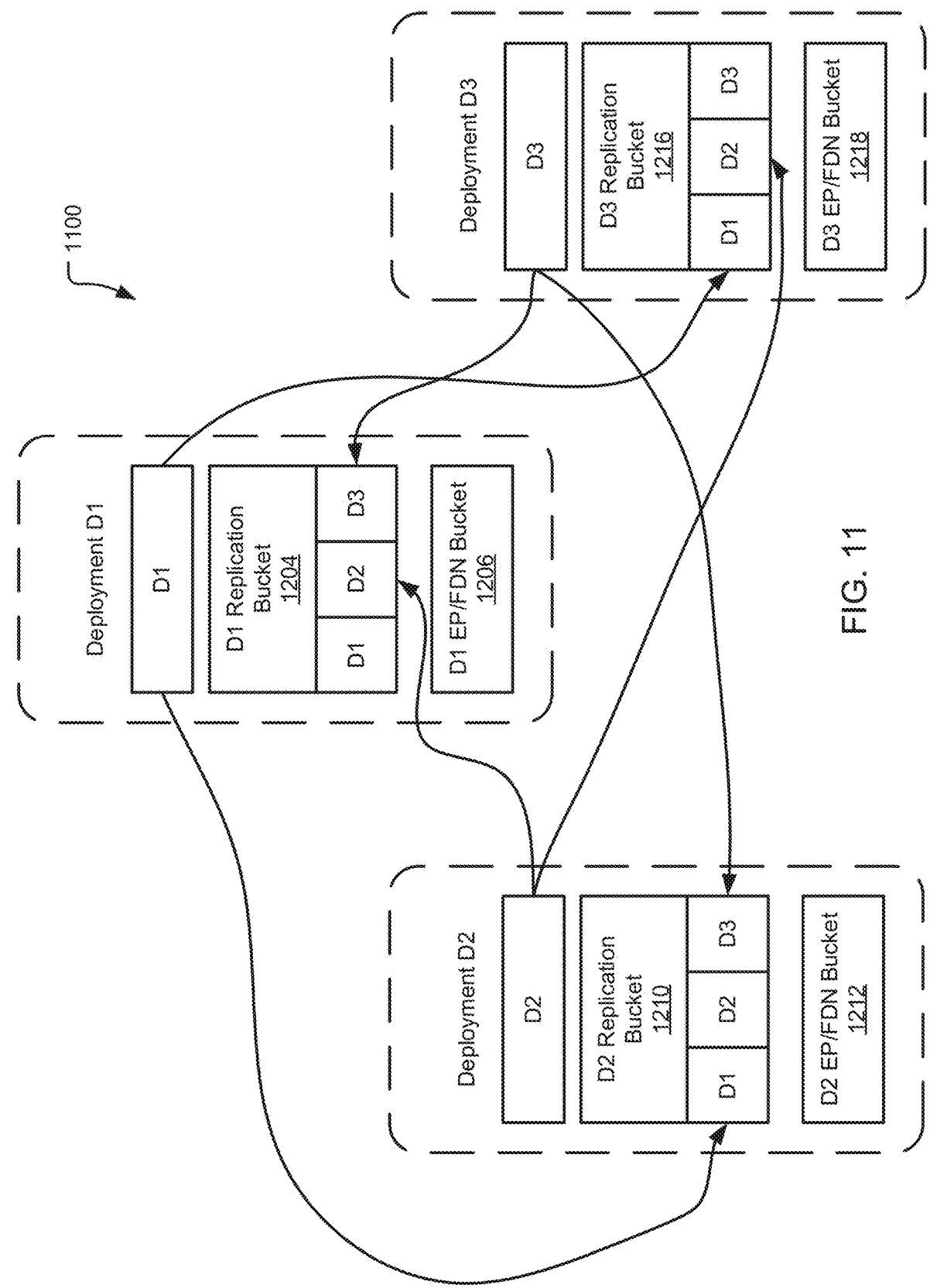
FIG. 11 is a schematic diagram of a deployment architecture in accordance with the teachings and principles of the disclosure.

In an embodiment, when importing a snapshot response, the table at the target deployment dep2 will be rolled back to the sent table version if necessary. The added files of the snapshot response may receive a local short name based on the DML's job ID and may include a postfix or other suitable identifier (the postfix "_g" is depicted in FIGS. 9-11). The original global file references may be stored as part of metadata. Global file references that need to be deleted may be converted into local short names at the target deployment dep2 using an in-memory index. In an embodiment, local short names are added to the DML's EP files as part of the deleted short names section.

The importation 1000 of the snapshot response as illustrated in FIG. 10 illustrates that table T is rolled back to table version No. 342 if necessary. As illustrated in the embodiment in FIG. 10, the added files are added to the table using a local short name appended with "_g", for example fdn25_g and fdn26_g. The original global file references are preserved, including (dep1, fdn15) and (dep0, fdn6). Additionally, the deleted global file references are converted into local short names, including (dep1, fdn12), (dep0, fdn4), and (dep2, fdn27), which are converted to fdn22_g, fdn24_g, and fdn27. Additionally, as illustrated in FIG. 10, the local deleted short names are added to a deleted section of the DML's EP files. The table may be pruned by a compactor and both tables may contain the same state.

FIG. 11 is a schematic diagram illustrating a deployment architecture 1100 for replicating a database. The deployment architecture 1100 includes a deployment D1, deployment D2, and a deployment D3. The deployment D1 includes a D1 replication bucket 1204 where it receives messages from other deployments. Similarly, the deployment D2 includes a D2 replication bucket 1210 and the deployment D3 includes a D3 replication bucket 1216. Each of the replication buckets 1204, 1210, 1216 is split into sub-buckets, including one sub-bucket per deployment. Each of the sub-buckets of the replication buckets 1204, 1210, 1216 may be configured independently with permissions and access credentials. Deployment D1 includes a D1 EP/FDN bucket 1206 (i.e., a metadata and micro-partition bucket), deployment D2 includes a D2 EP/FDN bucket 121 (i.e., a metadata and micro-partition bucket), and deployment D3 includes a D2 EP/FDN bucket 1218 (i.e., a metadata and micro-partition bucket).

In an embodiment, when a new deployment is generated, a new replication bucket for that deployment is generated, including all sub-buckets for all deployments, such that other deployments may send messages to the new deployment. Additionally, a new sub-bucket for the deployment may be added to the replication buckets of all other deployments such that the new deployment may send messages to the existing deployments. In an embodiment, ops will need to go to each existing deployment to create two new stages for the new deployment (inbound and outbound) to register the new deployment.

The messaging infrastructure as illustrated in FIG. 11 provides an infrastructure that enables deployments to exchange generic messages by exchanging files on buckets. The messages may be exchanged via cloud storage and may be transparent to an associated client account. For an associated client account, it may appear the account is only interacting with a regular data protection officer (DPO) on the local micro-partition. A message service layer may encapsulate how the message DPOs are serialized and exchanged.

Figure 12:
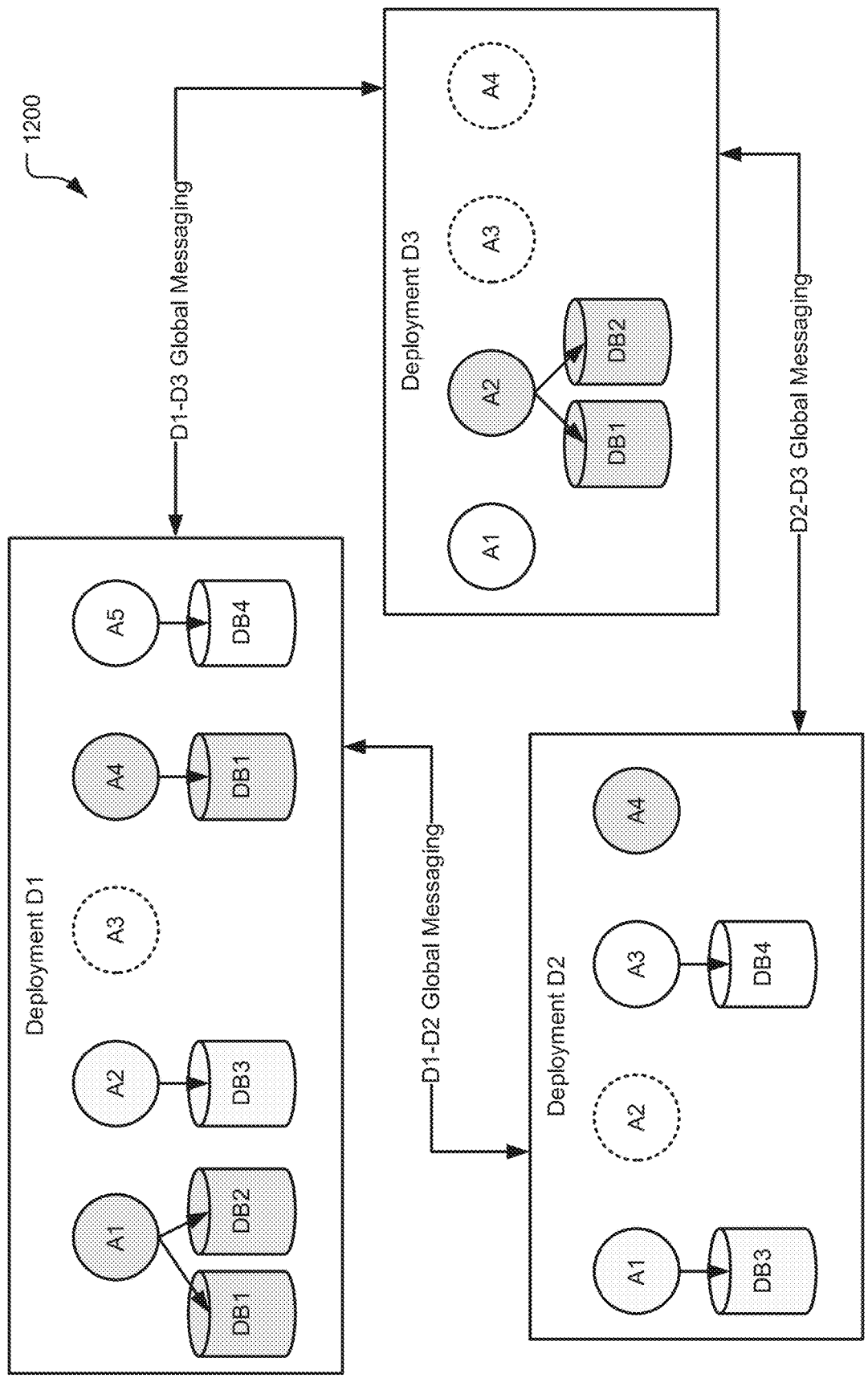
FIG. 12 is a schematic diagram of a global deployment group in accordance with the teachings and principles of the disclosure.

FIG. 12 is a schematic diagram illustrating a global deployment group 1200 including three deployments for replicating a database. During database replication as disclosed herein, metadata is persisted and exchanged within deployment replication groups (may be referred to as a deployment group). Deployment groups are generated to enable replication between each of the deployment groups. In an embodiment, each deployment maintains a list of all other deployments in the group, including itself. In an embodiment, the list is maintained manually within each deployment using a "create deployment" data definition language (DDL) which will be used to add new deployments in the group. This DDL may be executed on every existing deployment. Within a deployment, an account may be made global (versus local) to form a new account replication group or to join an existing account replication group. Only accounts which are part of the same account replication group may replicate data among the group. In an embodiment, forming a new account replication group is initially performed in response to a client account request to link two or more of the client's accounts together. The new accounts may be automatically placed in the same replication group as the account from which the create statement was issued.

In an embodiment, accounts within a single account group may promote local objects to be global or may directly create global objects. In various embodiment, an object may include a database, a user, a role, or a warehouse. Once an object is global, it may be replicated within any account in the global account group. Replicating a global object is achieved by first creating a local replica object for that global object on all accounts where the object is to be replicated and then by refreshing these replicas explicitly, on schedule, or continuously. In an embodiment, only databases may be made global by an account administrator, and replicas may only be refreshed explicitly by the owner of the database.

In an embodiment, there exists three classes of metadata to manage and replication. One class of metadata is directed to deployments, including metadata about each deployment of a deployment group that is created and replicated manually by replication. One class of metadata is directed to global accounts, wherein all global accounts of a deployment may be replication to all other deployments within the deployment group it belongs to. One class of metadata include global databases, including all global databases on an account that may also be replicated within the same account group. In an embodiment, only information about all replicas of a global database are replication in the account group to the subset of deployments where the account group exists.

FIG. 12 illustrates an example using global deployment group including three deployments, deployment D1, deployment D2, and deployment D3. As illustrated in FIG. 12, deployment D1 includes five accounts, including D1.A1, D1.A2, D1.A3, D1.A4, and D1.A5. Deployment D2 includes four accounts, including D2.A1, D2.A2, D2.A3, and D2.A4. Deployment D3 includes four accounts, including D3.A1, D3.A2, D3.A3, and D3.A4. In the embodiment illustrated in FIG. 12, there exist four local accounts that are not part of any group and cannot have global objects. The four local accounts include D1.A3, D2.A2, D3.A3, and D3.A4 and are illustrated with a dotted line. Only global accounts (i.e., the accounts illustrated with a solid line and shaded with no fill, light grey fill, or dark grey fill) may create or replicate global databases. In the example illustrated in FIG. 12, there exists four global databases, including DB1, DB2, DB3, and DB4. The same global database may only exist or be replicated within the same account group. In the example illustrated in FIG. 12, DB1 and DB2 are global databases that may only be replicated within the account group including D1.A1, D1.A4, D2.A4, and D3.A2. Further, DB3 may only be replicated within the account group including D1.A2 and D2.A. Further, DB4 may only be replicated within the account group including D1.A5 and D2.A3. Additionally, as illustrated in FIG. 12, global databases are not necessarily replicated by all accounts within a global account group. For example, a client owner of the dark shaded account group (associated with DB1 and DB2) did not replicate DB2 with the D1.A4 account.

In an embodiment, metadata about all replicas of a global object is replicated to all accounts in the account group. In certain embodiments this may permit a local account (i.e., those illustrated with a dotted line) administrator to list all replicas, local or remote, of any global object in the group. This may enable a client account administrator to generate new replicas of a global object in other accounts in the account group (e.g., the account group illustrated with no fill, light grey fill, or dark grey fill), by specifying that the new object being created is a replica of that global object.

As an example, the client account for account D2.A4 (associated with the dark grey fill account group) wishes to replicate global database DB2 to that account. In that account, the client account may execute a command to show global databases. The command will list replicas of all global databases in the account group. Based on this example, the command will show five examples as illustrated in Table 1, below.

TABLE 1

| Region | Account | Replication Group | Name |
|---|---|---|---|
| D1 | A1 | b4a193a3-77cc-49dc-a9c8-2a2ee1ae9b1e | DB1 |
| D1 | A4 | b4a193a3-77cc-49dc-a9c8-2a2ee1ae9b1e | DB1 |
| D3 | A2 | b4a193a3-77cc-49dc-a9c8-2a2ee1ae9b1e | DB1 |
| D1 | A1 | 0400d847-4199-4f79-9a74-381761bc0cc9 | DB2 |
| D3 | A2 | 0400d847-4199-4f79-9a74-381761bc0cc9 | DB2 |

As illustrated in Table 1, the "replication group" column depicts the same values for all replicas of the same database. The database replicase are linked together like an account in the account group. These databases further form a replication group with an identification number equal to the replication group number. Further to the aforementioned example, the client account of D2.A4 may create anew replica in the database replication group named "0400d847-4199-4f79-9a74-38761bc0cc9" by issuing a command to do so. It should be appreciated that the local name of the replica may be anything and specifying the replication group identification number makes the database part of the same replication group as the other databases that were in that group. After generating anew database replica, the client account for D2.A4 may then issue a command to show all database replicase and will then receive a list with the replica that was just generated, as in Table 2 illustrated below.

TABLE 2

| Region | Account | Replication Group | Name |
| --- | --- | --- | --- |
| D1 | A1 | b4a193a3-77cc-49dc-a9c8-2a2ee1ae9b1e | DB1 |
| D1 | A4 | b4a193a3-77cc-49dc-a9c8-2a2ee1ae9b1e | DB1 |
| D3 | A2 | b4a193a3-77cc-49dc-a9c8-2a2ee1ae9b1e | DB1 |
| D1 | A1 | 0400d847-4199-4f79-9a74-381761bc0cc9 | DB2 |
| D3 | A2 | 0400d847-4199-4f79-9a74-381761bc0cc9 | DB2 |
| D2 | A4 | 0400d847-4199-4f79-9a74-381761bc0cc9 | DB5 |

Further to the aforementioned example, the same command issued from any account in that group (i.e., D1.A1 or D1.A4) will generate exactly the same list. Propagation of replicated metadata may take a period of time, for example it may take several seconds, and after that period of time every other deployment will know about the new replica.

Similar to the "show global databases" command, a "show global accounts" command may be issues to generate a list of the set of accounts in the group. Continuing with the aforementioned example, if the client account for D3.A2 issues the "show global accounts" command, it will return a list as in Table 3, below.

TABLE 3

| Region | Account |
| --- | --- |
| D1 | A1 |
| D1 | A4 |
| D2 | A4 |
| D3 | A2 |

As illustrated in Table 3, the account replication group identification number is not exposed because there is only one account replication group for a given customer. When running the same command from any client account the in the deployment group, the command will generate a list showing all account groups, and in that case one column may be added that shows the replication group identification number.

Storing Metadata about Global Entities

Each deployment in a deployment group may maintain metadata about all global accounts in the group. Again, using the aforementioned example, each deployment may maintain the list of all global accounts, i.e., D1.A1, D1.A2, D1.A4, D1.A5, D2.A1, D2.A2, D3.A1 and D3.A3. The list of all global accounts may be fully replicated. In addition, each deployment will maintain metadata about all global objects in the subset of account groups that exist in that deployment. Still using the example, deployment D1 maintains metadata about all global objects owned by the no-fill, light grey, and dark grey sub groups. Because deployment D2 only hosts accounts from the dark grey and no-fill account group, it will only need to maintain metadata about databases belonging to those two account groups. Further, deployment D3 must only maintain information about global databases in the light grey and no-fill account groups.

In each deployment, a single Data Persistence Object ("DPO") may be utilized and may be named the GlobalEntitiesDPO. A DPO describes a representation of a metadata objection that may be persisted in a metadata store, where the metadata store is separate from database data. A GlobalEntitiesDPO is a DPO that is specific to a "global" or "replicated" object. The global/replication specific information may include source deployment information, source account information, replication UUID, external UUID, and so forth. The single DPO may store metadata about all global object replicas including global accounts. The accounts may be modeled in an account group as replicas of the same global account. Thus, information about global accounts and to-level account entities, such as databases, users, roles, and warehouses, is unified. Further, with each deployment, the GlobalEntitiesDPO may store information about any global entity replica the deployment needs to know, i.e., information on all global account and database replicas the deployment needs to know about (for example, any replicas in any account group that exist on the deployment).

In addition to GlobalEntitiesDPO, whose content is replicated between deployments, a deployment may identify all entities that are global in the deployment. For this, a new DPO is not needed but may enhance an existing representation of an object that can be persisted in the metadata store (may be referred to as a "BaseDictionaryDPO." A field may be added for the global identification number which, if not null, will indicate the dictionary entity is global. Further, all global dictionary entities may be indexed by adding a new slice named "global" to find any global entity given the global identification number. In an embodiment this may simplify the process of finding all global entities of a certain type in a particular deployment or in a particular account.

In an embodiment, generating a global database includes creating the first master replica in a global database replication group. When this first master replica is created, a global database replication group may be automatically created for it. Other replicas in the group may be created using a "replication group" command.

In an embodiment, a global object may be converted back into a local object. A command to alter the account may be provided to a client or administrator account to transition an existing global account into a local account. As a side effect of this command, all global objects within the account may be made local. Further, a single global database may be made back into a regular local database using a similar command.

In an embodiment, any change made to a replica will be replicated to all other deployments interested in the change. A change may include a create, drop, update, or other adjustment. Replication of the change will occur as soon as possible and may occur in less than five seconds. Further, a replication will be made of all replicas created in the deployment at a regular time period, for example once per hour, even if nothing has changed. This may ensure that if anything fails, there will still be some coverage.

Figure 13:
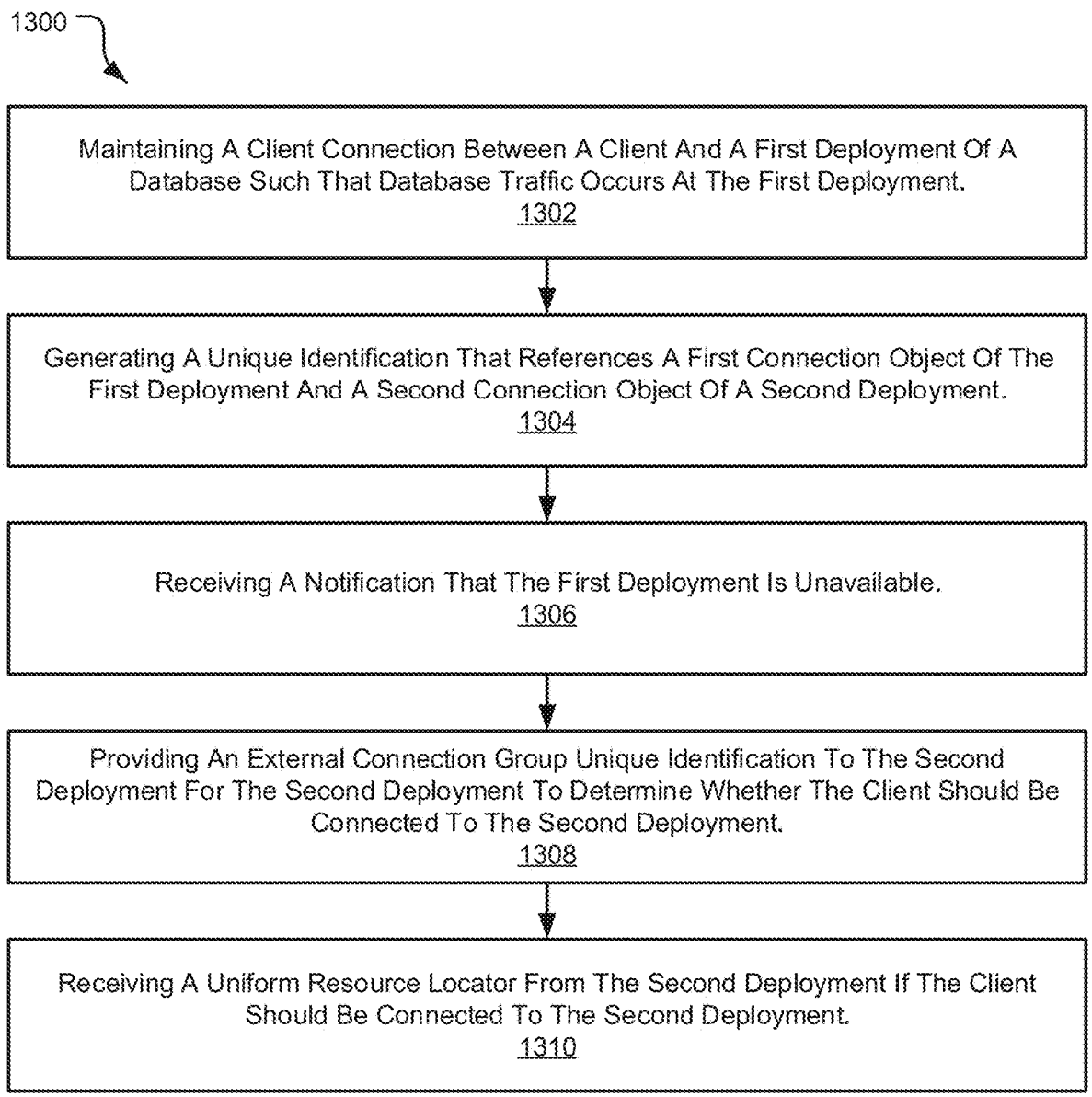
FIG. 13 is a schematic flow chart diagram of a method for transitioning a client connection in a multiple deployment database system, in accordance with the teachings and principles of the disclosure.

FIG. 13 is a schematic flow chart diagram of a method 1300 for transitioning a client connection in a multiple deployment database system. The method 1300 may be carried out by any suitable computing resource such as a resource manager 402 or replication and failover manager 528 as disclosed herein.

The method 1300 begins and the computing resource maintains at 1302 a client connection between a client and a first deployment of a database such that database traffic occurs at the first deployment. The method 1300 continues and the computing resource generates at 1304 a unique identification that references a first connection object of the first deployment and a second connection object of a second deployment. The computing resource receives at 1306 a notification that the first deployment is unavailable. The computing resource provides at 1308 an external connection group unique identification to the second deployment for the second deployment to determine whether the client should be connected to the second deployment. The external connection group unique identification provides an indication to a client of which connection groups the client is associated with. The external connection group unique identification may be based on the unique identification. The computing resource receives at 1310 a uniform resource locator (URL) from the second deployment if the client should be connected to the second deployment.

Figure 14:
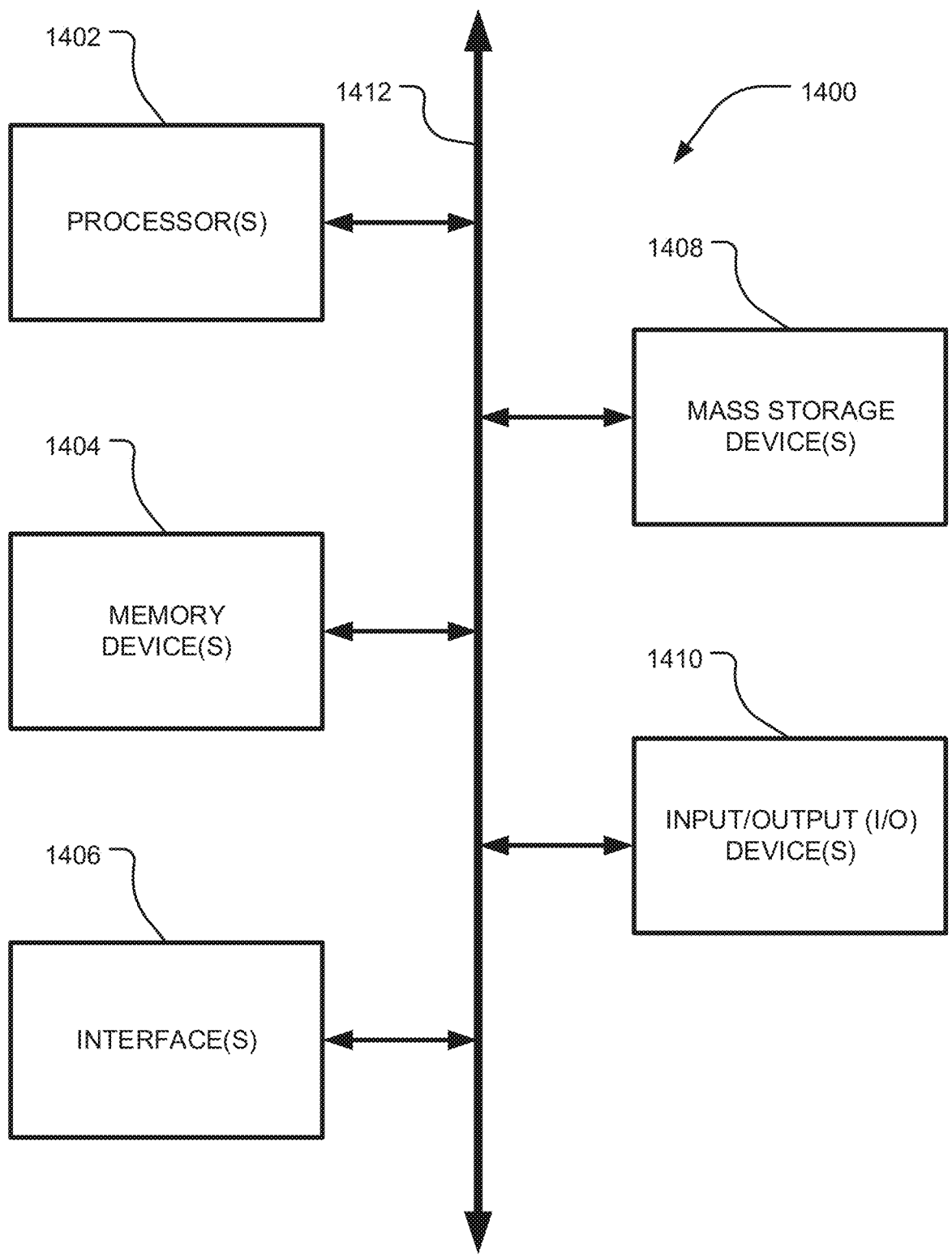
FIG. 14 is an example computing device in accordance with the teachings and principles of the disclosure.

FIG. 14 is a block diagram depicting an example computing device 1400. In some embodiments, computing device 1400 is used to implement one or more of the systems and components discussed herein. For example, computing device 1400 may allow a user or administrator to access the resource manager 1402. Further, computing device 1400 may interact with any of the systems and components described herein. Accordingly, computing device 1400 may be used to perform various procedures and tasks, such as those discussed herein. Computing device 1400 can function as a server, a client or any other computing entity. Computing device 1400 can be any of a wide variety of computing devices, such as a desktop computer, a notebook computer, a server computer, a handheld computer, a tablet, and the like.

Computing device 1400 includes one or more processor(s) 1402, one or more memory device(s) 1404, one or more interface(s) 1406, one or more mass storage device(s) 1408, and one or more Input/Output (I/O) device(s) 1410, all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM)) and/or nonvolatile memory (e.g., read-only memory (ROM)). Memory device(s) 1404 may also include rewritable ROM, such as Flash memory.

Mass storage device(s) 1408 include various computer readable media, such as magnetic tapes, magnetic disks, optical disks, solid state memory (e.g., Flash memory), and so forth. Various drives may also be included in mass storage device(s) 1408 to enable reading from and/or writing to the various computer readable media. Mass storage device(s) 1408 include removable media and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Interface(s) 1406 include various interfaces that allow computing device 1400 to interact with other systems, devices, or computing environments. Example interface(s) 1406 include any number of different network interfaces, such as interfaces to local area networks (LANs), wide area networks (WANs), wireless networks, and the Internet.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400 and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware, for the purposes of performing all or parts of query operations.

EXAMPLES

The following examples pertain to further embodiments.

Example 1 is a system for transitioning a client connection in a multiple deployment database system. The system includes means for maintaining the client connection between a client and a first deployment. The system includes means for generating a unique identification that references a first connection object of the first deployment and a second connection object of a second deployment. The system includes means for receiving a notification that the first deployment is unavailable. The system includes means for providing an external connection group unique identification to the second deployment for the second deployment to determine whether the client should be connected to the second deployment. The system includes means for receiving a uniform resource locator from the second deployment.

Example 2 is a system as in Example 1, wherein determining whether the client should be connected to the second deployment comprises the second deployment performing a lookup with the external connection group unique identification, wherein: the client connection should be transitioned to the second deployment if the lookup is true; and the client connection should not be transitioned to the second deployment if the lookup is false.

Example 3 is a system as in any of Examples 1-2, wherein the client connection points the client to a current primary deployment and causes traffic to be directed to the current primary deployment, wherein the traffic comprises one or more of updates to the database data or queries on the database data.

Example 4 is a system as in any of Examples 1-3, wherein the client connection causes updates to the database data to first be executed on the current primary deployment such that the updates may be propagated to one or more secondary deployments based on the current primary deployment.

Example 5 is a system as in any of Examples 1-4, wherein the first deployment and the second deployment are one or more of: serviced by different computing resources; located in different geographic regions; serviced by different cloud-based database providers; store different database data associated with the client; or store different database data associated with different clients.

Example 6 is a system as in any of Examples 1-5, wherein the notification that the first deployment is unavailable comprises one or more of: a notification of an invalid connection that is received from the first deployment; or an error code that is received from the first deployment.

Example 7 is a system as in any of Examples 1-6, wherein the means for providing the external connection group unique identification to the second deployment is configured to further provide the external connection group unique identification to one or more additional deployments to determine which of the second deployment or the one or more additional deployments matches the external connection group unique identification and should be connected to the client, and wherein only one of the second deployment or the one or more additional deployments matches the external connection group unique identification.

Example 8 is a system as in any of Examples 1-7, wherein the first deployment is unavailable due to an invalid connection between the client and the first deployment, wherein the first deployment is unavailable due to one or more of: an error at the first deployment; a scheduled downtime for the first deployment; a power outage at the first deployment; an unexpected downtime at the first deployment; or a scheduled transition to discontinue the client connection between the client and the first deployment.

Example 9 is a system as in any of Examples 1-8, further comprising means for transitioning the client connection from the first deployment to the second deployment such that database traffic is executed at the second deployment, wherein the means for transitioning the client connection is configured to transition in response to receiving the uniform resource locator from the second deployment.

Example 10 is a system as in any of Examples 1-9, wherein the client connection causes updates to the database data to be executed at an applicable primary deployment, and wherein the system further comprises means for replicating the updates made to the database data at the applicable primary deployment to one or more secondary deployments such that the one or more secondary deployments comprise an up-to-date version of the database data and may take over as a new primary deployment if the applicable primary deployment becomes unavailable.

Example 11 is a method for transitioning a client connection in a multiple deployment database system. The method includes maintaining the client connection between a client and a first deployment such that database traffic occurs at the first deployment. The method includes generating a unique identification that references a first connection object of the first deployment and a second connection object of a second deployment. The method includes receiving a notification that the first deployment is unavailable. The method includes providing an external connection group unique identification to the second deployment for the second deployment to determine whether the client should be connected to the second deployment. The method includes receiving a uniform resource locator from the second deployment if the client should be connected to the second deployment.

Example 12 is a method as in Example 11, wherein the notification that the first deployment is unavailable is based on an invalid connection between the client and the first deployment, wherein the first deployment is unavailable due to one or more of: an error at the first deployment; a scheduled downtime for the first deployment; a power outage at the first deployment; an unexpected downtime at the first deployment; or a scheduled transition to discontinue the client connection between the client and the first deployment.

Example 13 is a method as in any of Examples 11-12, further comprising, in response to receiving the uniform resource locator from the second deployment, transitioning the client connection from the first deployment to the second deployment such that database traffic is executed at the second deployment.

Example 14 is a method as in any of Examples 11-13, wherein providing the external connection group unique identification to the second deployment comprises sending a REST (Representational State Transfer) request from the client to the second deployment.

Example 15 is a method as in any of Examples 11-14, wherein receiving the notification that the first deployment is unavailable comprises receiving an error code from the first deployment, and wherein the method further comprises: in response to receiving the error code, sending a retry request to the first deployment; receiving a new error code from the first deployment; and in response to receiving the new error code from the first deployment, providing the external connection group unique identification to the second deployment.

Example 16 is a processor that is programmable to execute instructions stored in non-transitory computer readable storage media, the instructions comprising: maintaining the client connection between a client and a first deployment such that database traffic occurs at the first deployment; generating a unique identification that references a first connection object of the first deployment and a second connection object of a second deployment; receiving a notification that the first deployment is unavailable; providing an external connection group unique identification to the second deployment for the second deployment to determine whether the client should be connected to the second deployment; and receiving a uniform resource locator from the second deployment if the client should be connected to the second deployment.

Example 17 is a processor as in Example 16, wherein the notification that the first deployment is unavailable is based on an invalid connection between the client and the first deployment, wherein the first deployment is unavailable due to one or more of: an error at the first deployment; a scheduled downtime for the first deployment; a power outage at the first deployment; an unexpected downtime at the first deployment; or a scheduled transition to discontinue the client connection between the client and the first deployment.

Example 18 is a processor as in any of Examples 16-17, wherein the instructions further comprise, in response to receiving the uniform resource locator from the second deployment, transitioning the client connection from the first deployment to the second deployment such that database traffic is executed at the second deployment.

Example 19 is a processor as in any of Examples 16-18, wherein receiving the notification that the first deployment is unavailable comprises receiving an error code from the first deployment, and wherein the instructions further comprise: in response to receiving the error code, sending a retry request to the first deployment; receiving a new error code from the first deployment; and in response to receiving the new error code from the first deployment, providing the external connection group unique identification to the second deployment.

Example 20 is a processor as in any of Examples 16-19, wherein determining whether the client should be connected to the second deployment comprises the second deployment performing a lookup with the unique identification, wherein: the client connection should be transitioned to the second deployment if the lookup is true; and the client connection should not be transitioned to the second deployment if the lookup is invalid or false.

Example 21 is a "real-world" example of implementing the methods, systems, and devices as disclosed herein. It should be appreciated that this real-world example is non-limiting and is provided only as an exemplary implementation for explanation purposes only. In this example the "client" may refer to an account with a database system that connects with the database and transmits updates and queries on the database. Further in this example, the "user" may refer to a person or entity associated with the client.

In Example 21, the client has three database deployments, deployment D1, deployment D2, and deployment D3. Each of the three deployments is located in a different geographic region. Deployment D1 is located on the West Coast in the United States, deployment D2 is located on the East Coast in the United States, and deployment D3 is located in China. The user prefers that the West Coast deployment (i.e., deployment D1) is the primary deployment for the database data. Therefore, the user also prefers that the East Coast deployment (i.e., deployment D2) and the China deployment (i.e., deployment D3) are both secondary deployments. Each of the deployments maintains a complete copy of the database data, including all tables, all micro-partitions, all version history, and all metadata. The user may prefer that deployment D1 be the primary deployment for any reason. For example, deployment D1 may be located nearer to the user's place of business, the operation of deployment D1 may be less expensive, the user may believe deployment D1 is more reliable, and so forth. Alternatively, the user might not have any preference regarding which deployment is the primary deployment, and this may be set by default by the cloud-based database provider.

Further to Example 21, when the client initiates a DML command on the database (i.e., an insert, update, delete, or merge), the DML command is executed on the primary deployment (i.e., deployment D1 located in the West Coast). The updates made to the primary deployment are propagated to each of the secondary deployments by way of the replication methods and systems disclosed herein (see for example FIGS. 6-11). The user may wish to take deployment D1 (i.e., the West Coast deployment) offline for scheduled maintenance. In preparation for taking deployment D1 offline, the client may have each of the secondary deployments send a refresh request to deployment D1 to ensure that each of the secondary deployments is an accurate and up-to-date copy of deployment D1. The user may wish to make deployment D2 the new temporary primary deployment while deployment D1 is offline for the scheduled maintenance. Further, the user may wish to have deployment D3 serve as a backup to deployment D2 when deployment D2 is temporarily serving as the primary deployment and deployment D1 is offline. Therefore, deployment D3 will continue to serve as a secondary deployment and deployment D2 will temporarily serve as the new primary deployment. The client or a system administrator associated with the database provider may initiate a connection transition such that the client is connected to deployment D2 rather than deployment D1 in preparation for deployment D2 going offline.

Further to Example 21, the connection transition is initiated and deployment D1 can no longer communication with the client. Deployment D1 returns a notification of an invalid connection to the client. In response to receiving the notification of an invalid connection from deployment D1, the client provides an external connection group UUID (i.e., conn_uuid, see 216 or 316) to deployment D2 and to deployment D3 to determine which of the secondary deployments should become the new primary deployment. Each of deployment D2 and deployment D3 receives the external connection group unique identification and performs a lookup using the external connection group unique identification. When deployment D2 performs the lookup, the lookup will be true because deployment D2 is scheduled to become the new primary deployment. In response to the lookup being true, deployment D2 will return a URL to the client. The client will use the URL to connect to deployment D2 and to resume database operations at deployment D2. When deployment D3 performs the lookup using the external connection group unique identification, the lookup will return an invalid or false result because deployment D3 is not scheduled to assume the role of primary deployment. In response to the lookup being invalid, deployment D3 will return an indication that the lookup is invalid, and the client will not attempt to connect to deployment D3. The client may be connected to deployment D2 for as long as necessary. For example, the client may be connected to deployment D2 for the duration of time deployment D1 is offline and then transition back to deployment D1. Before the client transitions back to deployment D1, all updates that were made to deployment D2 while deployment D1 was offline will need to be propagated to deployment D1 so that deployment D1 is an accurate and up-to-date representation of the database data.

Example 22 is a real-world example similar to Example 21. In Example 22, there is no scheduled connection transition from deployment D1 to deployment D2. Instead, deployment D1 becomes unexpectedly unavailable due to a system error, power outage, or other failure, and deployment D2 must assume the role of primary deployment so that database operations may continue even though the primary deployment (i.e., deployment D1) is unexpectedly unavailable. Example 22 represents an implementation where the replication methods, systems, and devices as disclosed herein are highly beneficial and provide security to the client.

In Example 22, deployment D1 becomes unexpectedly unavailable. There is no planned connection transition for the client's connection to the database. The client can no longer connect to deployment D1 because deployment D1 is unavailable. The client receives an error code. The client sends a retry request to deployment D1 and again receives an error code. The client sends a lookup request to each of deployment D2 and deployment D3. The connection request includes the external connection group UUID (i.e. the "conn_uuid"). Similar to the implementation discussed with respect to Example 21, each of deployment D2 and deployment D3 perform a lookup using the external connection group UUID. Because deployment D2 is the default backup deployment for times when deployment D1 becomes unavailable, the lookup performed by deployment D2 will return as true and deployment D2 will provide a URL to the client such that the client may connect to deployment D2.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A system comprising:
   at least one processor;
   a memory device including instructions, which when executed by the at least one processor, cause the at least one processor to perform operations comprising:
   generating a unique identification that references a first connection object of a first deployment and a second connection object of a second deployment of a database, the first deployment and the second deployment being separate deployments of the database provided by different cloud providers;
   receiving a notification that the first deployment is unavailable, the notification that the first deployment is unavailable comprises an indication of a scheduled downtime for the first deployment that has yet to occur;
   providing an external connection group unique identification to the second deployment for the second deployment to determine whether a client is to be connected to the second deployment, the external connection group unique identification and the unique identification being separate identifications to facilitate maintaining security in connecting to the second deployment;
   receiving a uniform resource locator from the second deployment when a client device is to be connected to the second deployment, the uniform resource locator being provided to the client device for connecting to the second deployment;
   executing updates to database data at an applicable primary deployment based on a client connection; and
   propagating the updates to one or more secondary deployments to have the one or more secondary deployments comprise an up-to-date version of the database data and take over as a new primary deployment when the applicable primary deployment becomes unavailable.

2. The system of claim 1, wherein the operations further comprise:
   prior to receiving the notification that the first deployment is unavailable, causing, using a client connection between the client device and the first deployment of the database, traffic to be directed from the client device to the first deployment, the traffic comprises updates to database data.

3. The system of claim 1, wherein the operations further comprise:
   after receiving the uniform resource locator from the second deployment, causing, using a second client connection between the client device and the second deployment of the database, traffic to be directed from the client device to the second deployment.

4. The system of claim 1, wherein the notification that the first deployment is unavailable comprises a second indication of at least one of:
   an error at the first deployment, or
   a power outage at the first deployment.

5. The system of claim 1, wherein providing the external connection group unique identification to the second deployment further comprises performing a lookup with the external connection group unique identification.

6. The system of claim 5, wherein the operations further comprise:
   providing an indication of transitioning to the second deployment when the lookup is true, wherein the indication at least includes the uniform resource locator from the second deployment.

7. The system of claim 5, wherein the operations further comprise:
   causing updates to database data to be executed on the second deployment to have the updates propagated to the first deployment and one or more additional secondary deployments after being executed at the second deployment.

8. The system of claim 1, wherein the first deployment and the second deployment comprise one or more of:
   serviced by different computing resources,
   located in different geographic regions, or
   serviced by different cloud-based database providers.

9. The system of claim 1, wherein the operations further comprise:
   transitioning the client connection from the first deployment to the second deployment to have database traffic is executed at the second deployment, wherein transitioning the client connection is in response to receiving the uniform resource locator from the second deployment.

10. The system of claim 1, wherein the operations further comprise:
    sending a REST (Representational State Transfer) request from the client device to the second deployment.

11. A method comprising:
    generating a unique identification that references a first connection object of a first deployment and a second connection object of a second deployment of a database, the first deployment and the second deployment being separate deployments of the database provided by different cloud providers;
    receiving a notification that the first deployment is unavailable, the notification that the first deployment is unavailable comprises an indication of a scheduled downtime for the first deployment that has yet to occur;
    providing an external connection group unique identification to the second deployment for the second deployment to determine whether a client is to be connected to the second deployment, the external connection group unique identification and the unique identification being separate identifications to facilitate maintaining security in connecting to the second deployment;

receiving a uniform resource locator from the second deployment when a client device is to be connected to the second deployment, the uniform resource locator being provided to the client device for connecting to the second deployment;

executing updates to database data at an applicable primary deployment based on a client connection; and propagating the updates to one or more secondary deployments to have the one or more secondary deployments comprise an up-to-date version of the database data and take over as a new primary deployment when the applicable primary deployment becomes unavailable.

12. The method of claim 11, further comprising:
prior to receiving the notification that the first deployment is unavailable, causing, using a client connection between the client device and the first deployment of the database, traffic to be directed from the client device to the first deployment, the traffic comprises updates to database data.

13. The method of claim 11, further comprising:
after receiving the uniform resource locator from the second deployment, causing, using a second client connection between the client device and the second deployment of the database, traffic to be directed from the client device to the second deployment.

14. The method of claim 11, wherein the notification that the first deployment is unavailable comprises a second indication of at least one of:
an error at the first deployment, or
a power outage at the first deployment.

15. The method of claim 11, wherein providing the external connection group unique identification to the second deployment further comprises performing a lookup with the external connection group unique identification.

16. The method of claim 15, further comprising:
providing an indication of transitioning to the second deployment when the lookup is true, wherein the indication at least includes the uniform resource locator from the second deployment.

17. The method of claim 15, further comprising:
causing updates to database data to be executed on the second deployment to have the updates propagated to the first deployment and one or more additional secondary deployments after being executed at the second deployment.

18. The method of claim 11, wherein the first deployment and the second deployment comprise one or more of:
serviced by different computing resources,
located in different geographic regions, or
serviced by different cloud-based database providers.

19. The method of claim 11, further comprising:
transitioning the client connection from the first deployment to the second deployment to have database traffic is executed at the second deployment, wherein transitioning the client connection is in response to receiving the uniform resource locator from the second deployment.

20. The method of claim 11, further comprising:
sending a REST (Representational State Transfer) request from the client device to the second deployment.

21. A non-transitory computer-readable medium comprising instructions, which when executed by at least one processor, cause the at least one processor to perform operations comprising:

generating a unique identification that references a first connection object of a first deployment and a second connection object of a second deployment of a database, the first deployment and the second deployment being separate deployments of the database provided by different cloud providers;

receiving a notification that the first deployment is unavailable, the notification that the first deployment is unavailable comprises an indication of a scheduled downtime for the first deployment that has yet to occur;

providing an external connection group unique identification to the second deployment for the second deployment to determine whether a client is to be connected to the second deployment, the external connection group unique identification and the unique identification being separate identifications to facilitate maintaining security in connecting to the second deployment;

receiving a uniform resource locator from the second deployment when a client device is to be connected to the second deployment, the uniform resource locator being provided to the client device for connecting to the second deployment;

executing updates to database data at an applicable primary deployment based on a client connection; and propagating the updates to one or more secondary deployments to have the one or more secondary deployments comprise an up-to-date version of the database data and take over as a new primary deployment when the applicable primary deployment becomes unavailable.

22. The non-transitory computer-readable medium of claim 21, wherein the operations further comprise:
prior to receiving the notification that the first deployment is unavailable, causing, using a client connection between the client device and the first deployment of the database, traffic to be directed from the client device to the first deployment, the traffic comprises updates to database data.

23. The non-transitory computer-readable medium of claim 21, wherein the operations further comprise:
after receiving the uniform resource locator from the second deployment, causing, using a second client connection between the client device and the second deployment of the database, traffic to be directed from the client device to the second deployment.

24. The non-transitory computer-readable medium of claim 21, wherein the notification that the first deployment is unavailable comprises a second indication of at least one of:
an error at the first deployment, or
a power outage at the first deployment.

25. The non-transitory computer-readable medium of claim 21, wherein providing the external connection group unique identification to the second deployment further comprises performing a lookup with the external connection group unique identification.

26. The non-transitory computer-readable medium of claim 25, wherein the operations further comprise:
providing an indication of transitioning to the second deployment when the lookup is true, wherein the indication at least includes the uniform resource locator from the second deployment.

27. The non-transitory computer-readable medium of claim 25, wherein the operations further comprise:
causing updates to database data to be executed on the second deployment to have the updates propagated to the first deployment and one or more additional secondary deployments after being executed at the second deployment.

28. The non-transitory computer-readable medium of claim 21, wherein the first deployment and the second deployment comprise one or more of:
serviced by different computing resources,
located in different geographic regions, or
serviced by different cloud-based database providers.

29. The non-transitory computer-readable medium of claim 21, wherein the operations further comprise:
transitioning the client connection from the first deployment to the second deployment to have database traffic is executed at the second deployment, wherein transitioning the client connection is in response to receiving the uniform resource locator from the second deployment.

30. The non-transitory computer-readable medium of claim 21, wherein the operations further comprise:
sending a REST (Representational State Transfer) request from the client device to the second deployment.

* * * * *

UNITED STATES PATENT AND TRADEMARK OFFICE
CERTIFICATE OF CORRECTION

PATENT NO. : 10,997,207 B2
APPLICATION NO. : 17/064888
DATED : May 4, 2021
INVENTOR(S) : Robinson et al.

It is certified that error appears in the above-identified patent and that said Letters Patent is hereby corrected as shown below:

On the Title Page

On page 2, in Column 2, item (56) under "Other Publications", Line 1, delete "Filed"," and insert --Filed Mar. 19, 2019",-- therefor Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*